United States Patent
Bendlak et al.

(10) Patent No.: US 11,078,889 B2
(45) Date of Patent: Aug. 3, 2021

(54) LIGHTNING PROTECTION SYSTEM AND METHOD FOR WIND TURBINE BLADES

(71) Applicant: ERICO INTERNATIONAL CORPORATION, Solon, OH (US)

(72) Inventors: Thomas Bendlak, Macedonia, OH (US); Matthew Flemming, Medina, OH (US); Daniel Pfaff, Los Angeles, CA (US)

(73) Assignee: ERICO International Corporation, Solon, OH (US)

( * ) Notice: Subject to any disclaimer, the term of this patent is extended or adjusted under 35 U.S.C. 154(b) by 204 days.

(21) Appl. No.: 16/504,417

(22) Filed: Jul. 8, 2019

(65) Prior Publication Data

US 2019/0331095 A1    Oct. 31, 2019

Related U.S. Application Data

(62) Division of application No. 15/153,978, filed on May 13, 2016, now Pat. No. 10,344,743.

(51) Int. Cl.
| | |
|---|---|
| *F03D 80/30* | (2016.01) |
| *F03D 1/06* | (2006.01) |
| *F03D 3/06* | (2006.01) |
| *H02G 13/00* | (2006.01) |

(52) U.S. Cl.
CPC ........... *F03D 80/30* (2016.05); *F03D 1/0675* (2013.01); *F03D 3/062* (2013.01); *H02G 13/80* (2013.01); *F05B 2230/21* (2013.01); *F05B 2230/60* (2013.01); *Y02E 10/72* (2013.01); *Y02P 70/50* (2015.11)

(58) Field of Classification Search
CPC ........ F03D 80/30; F03D 1/0675; F03D 3/062; H02G 13/80; Y02P 70/50; F05B 2230/21; F05B 2230/60; Y02E 10/72
See application file for complete search history.

(56) References Cited

U.S. PATENT DOCUMENTS

| | | |
|---|---|---|
| 5,584,726 A | 12/1996 | Le Gallic et al. |
| 6,457,943 B1 | 10/2002 | Olsen et al. |
| 6,979,179 B2 | 12/2005 | Larsen |
| 7,040,864 B2 | 5/2006 | Johansen et al. |
| 7,651,320 B2 | 1/2010 | Hansen |

(Continued)

FOREIGN PATENT DOCUMENTS

| | | |
|---|---|---|
| CN | 201679646 U | 12/2010 |
| CN | 201805143 U | 4/2011 |

(Continued)

OTHER PUBLICATIONS

LM Wind Power; wind turbine rotor blade promotional material; <www.lmwindpower.com/products-and-services/features-and-add-ons>; Aug. 4, 2016; 5 pages.

(Continued)

*Primary Examiner* — Richard A Edgar
(74) *Attorney, Agent, or Firm* — Quarles & Brady LLP

(57) ABSTRACT

A method of installing a lightning protection system can include forming a blade wall of a wind turbine to at least partly include a socket. A part of the socket can be removed, after forming the blade wall, to provide an opening through the blade wall. A receptor plug and a receptor element can be secured to the socket at the opening.

20 Claims, 29 Drawing Sheets

(56) References Cited

U.S. PATENT DOCUMENTS

| | | |
|---|---|---|
| 7,766,620 B2 | 8/2010 | Stam et al. |
| 7,883,321 B2 | 2/2011 | Bertelsen |
| 7,896,616 B2 | 3/2011 | Livingston et al. |
| 7,942,640 B2 | 5/2011 | Hiremath et al. |
| 8,133,031 B2 | 3/2012 | Arinaga et al. |
| 8,177,509 B2 | 5/2012 | Hansen |
| 8,182,227 B2 | 5/2012 | Jacobsen et al. |
| 8,191,255 B2 | 6/2012 | Kristensen et al. |
| 8,430,631 B2 | 4/2013 | Olsen |
| 8,517,681 B2 | 8/2013 | Naka et al. |
| 8,562,296 B2 | 10/2013 | De La Rua et al. |
| 8,632,306 B2 | 1/2014 | Olsen |
| 8,727,723 B2 | 5/2014 | Flemming et al. |
| 8,734,110 B2 | 5/2014 | Kuroiwa et al. |
| 8,888,454 B2 | 11/2014 | Hansen |
| 8,896,980 B2 | 11/2014 | Kristensen et al. |
| 9,169,826 B2 | 10/2015 | Muto |
| 10,697,441 B2* | 6/2020 | Klein ............. F03D 80/30 |
| 2007/0081900 A1 | 4/2007 | Nies |
| 2009/0053062 A1 | 2/2009 | Arinaga et al. |
| 2009/0196751 A1 | 8/2009 | Jacobsen et al. |
| 2010/0090472 A1 | 4/2010 | Berthelsen |
| 2012/0020791 A1 | 1/2012 | Flemming et al. |
| 2014/0112787 A1 | 4/2014 | Bracht et al. |
| 2014/0118177 A1 | 5/2014 | Appleton |
| 2014/0271190 A1 | 9/2014 | Hansen |
| 2014/0301857 A1 | 10/2014 | Richers et al. |
| 2015/0167642 A1 | 6/2015 | Hansen |
| 2015/0292487 A1 | 10/2015 | Ohlerich |
| 2015/0308415 A1 | 10/2015 | Rajasingam et al. |
| 2015/0377217 A1 | 12/2015 | Sandercock et al. |
| 2016/0090963 A1 | 3/2016 | Hoffman et al. |
| 2016/0090968 A1 | 3/2016 | Hansen |

FOREIGN PATENT DOCUMENTS

| | | |
|---|---|---|
| CN | 202645840 U | 1/2013 |
| CN | 203098162 U | 7/2013 |
| CN | 203374435 U | 1/2014 |
| CN | 203925891 U | 11/2014 |
| EP | 2930355 A1 | 10/2015 |
| JP | 2015132245 A | 7/2015 |
| JP | 2015161283 A | 9/2015 |
| WO | 2011080177 A1 | 7/2011 |
| WO | 2012076168 A2 | 6/2012 |
| WO | 2014200333 A1 | 12/2014 |
| WO | 2015055213 A1 | 4/2015 |
| WO | 2015055214 A1 | 4/2015 |
| WO | 2015055215 A1 | 4/2015 |
| WO | 2015124365 A1 | 8/2015 |

OTHER PUBLICATIONS

Erico Blade Surface Receptor Assembly spec sheet; <www.erico.com/category.asp?category=R3246>; Aug. 4, 2016; 1 page.

* cited by examiner

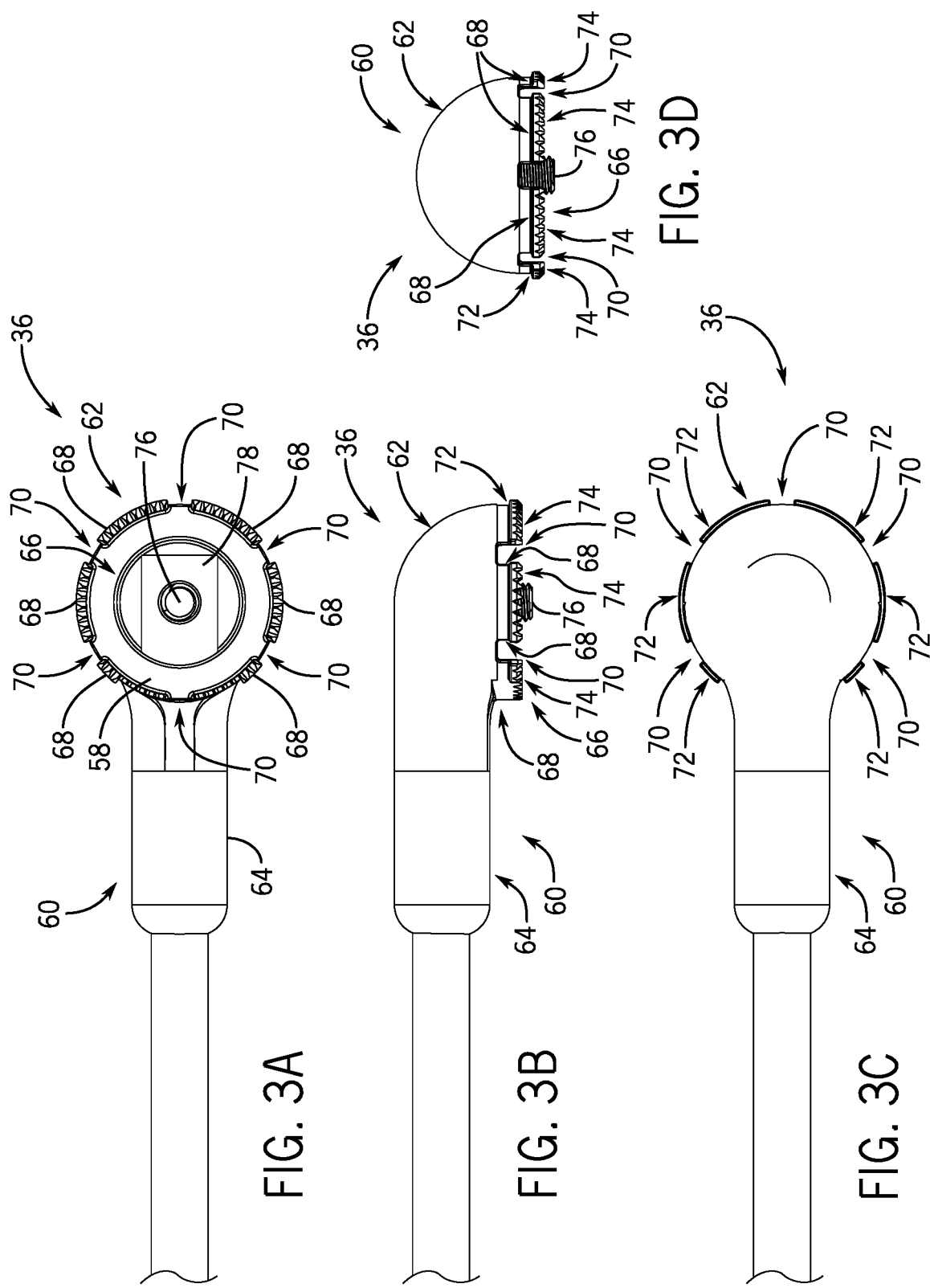

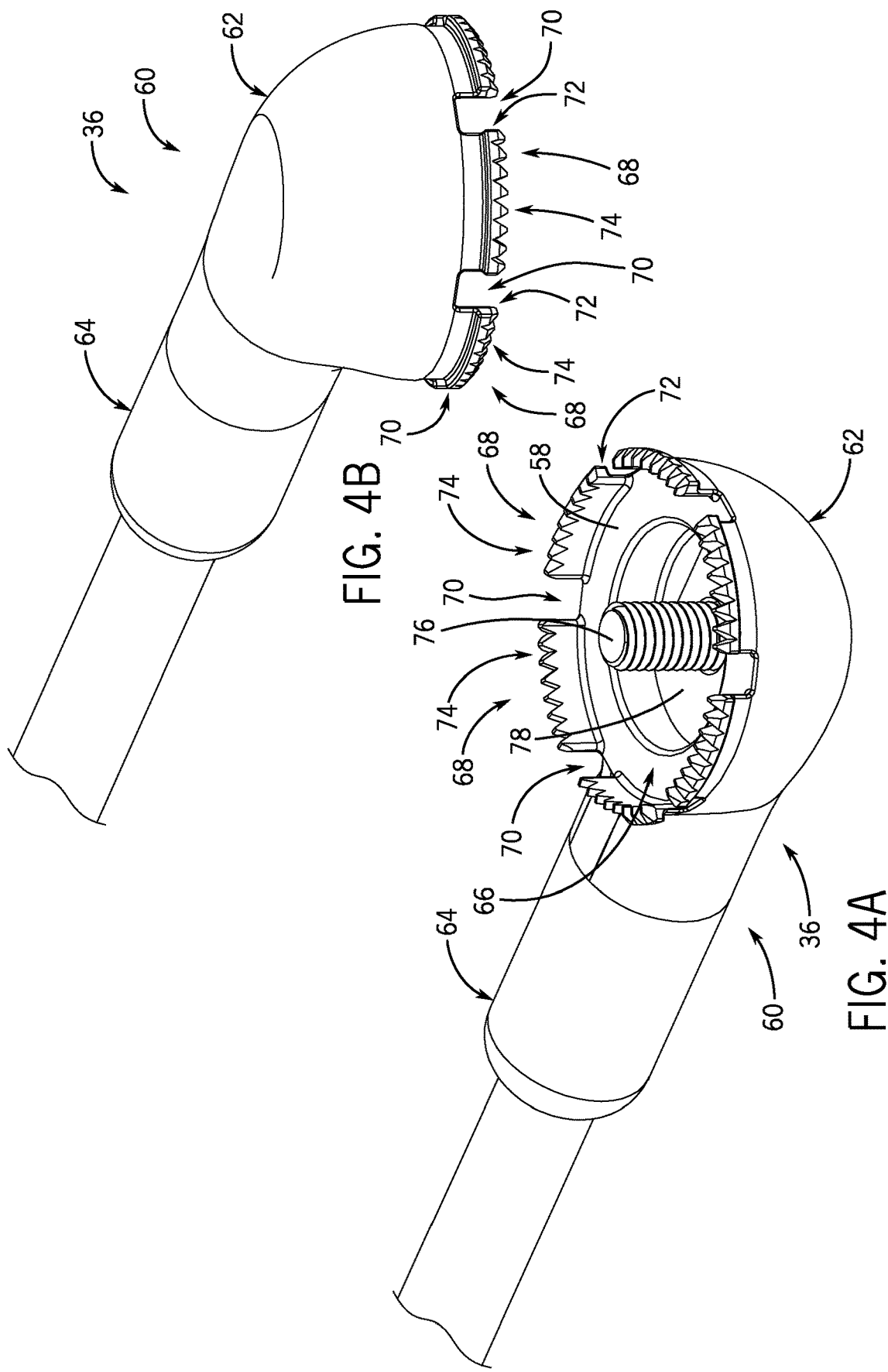

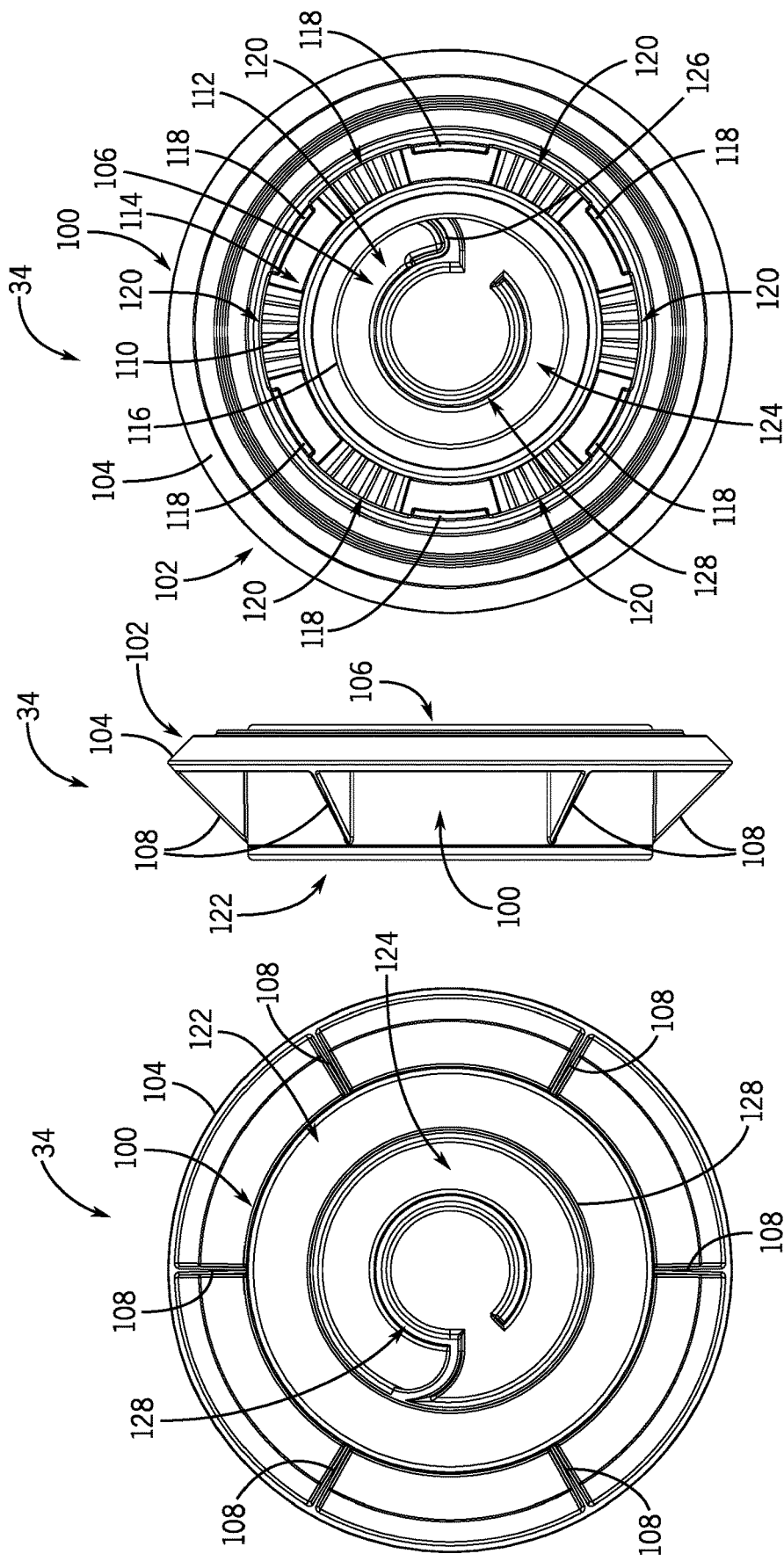

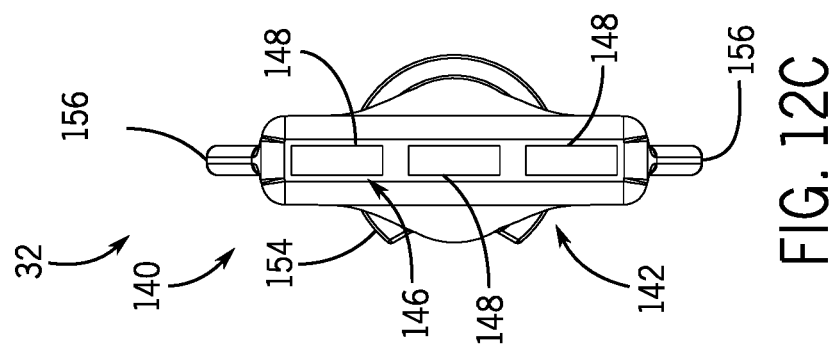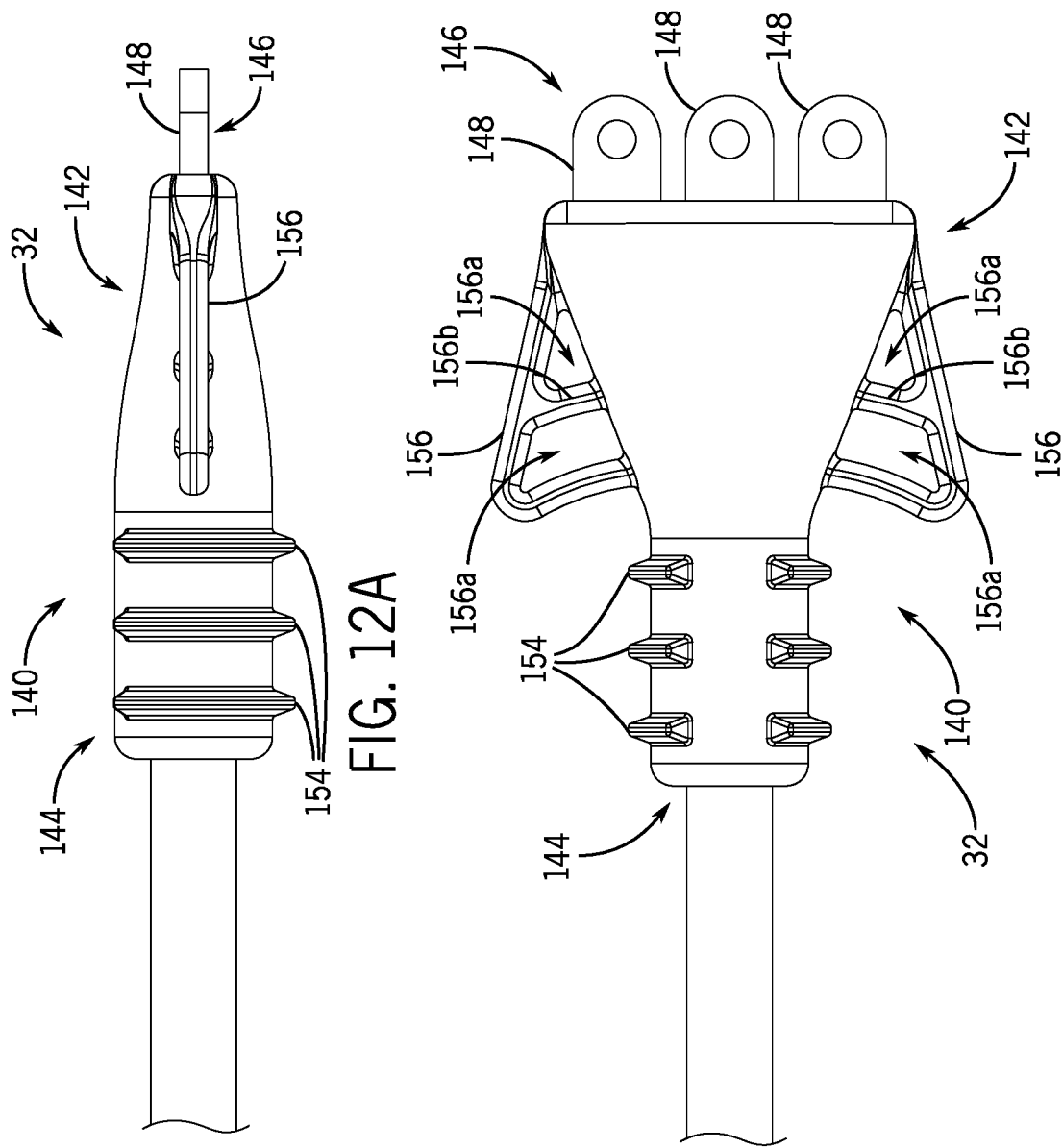

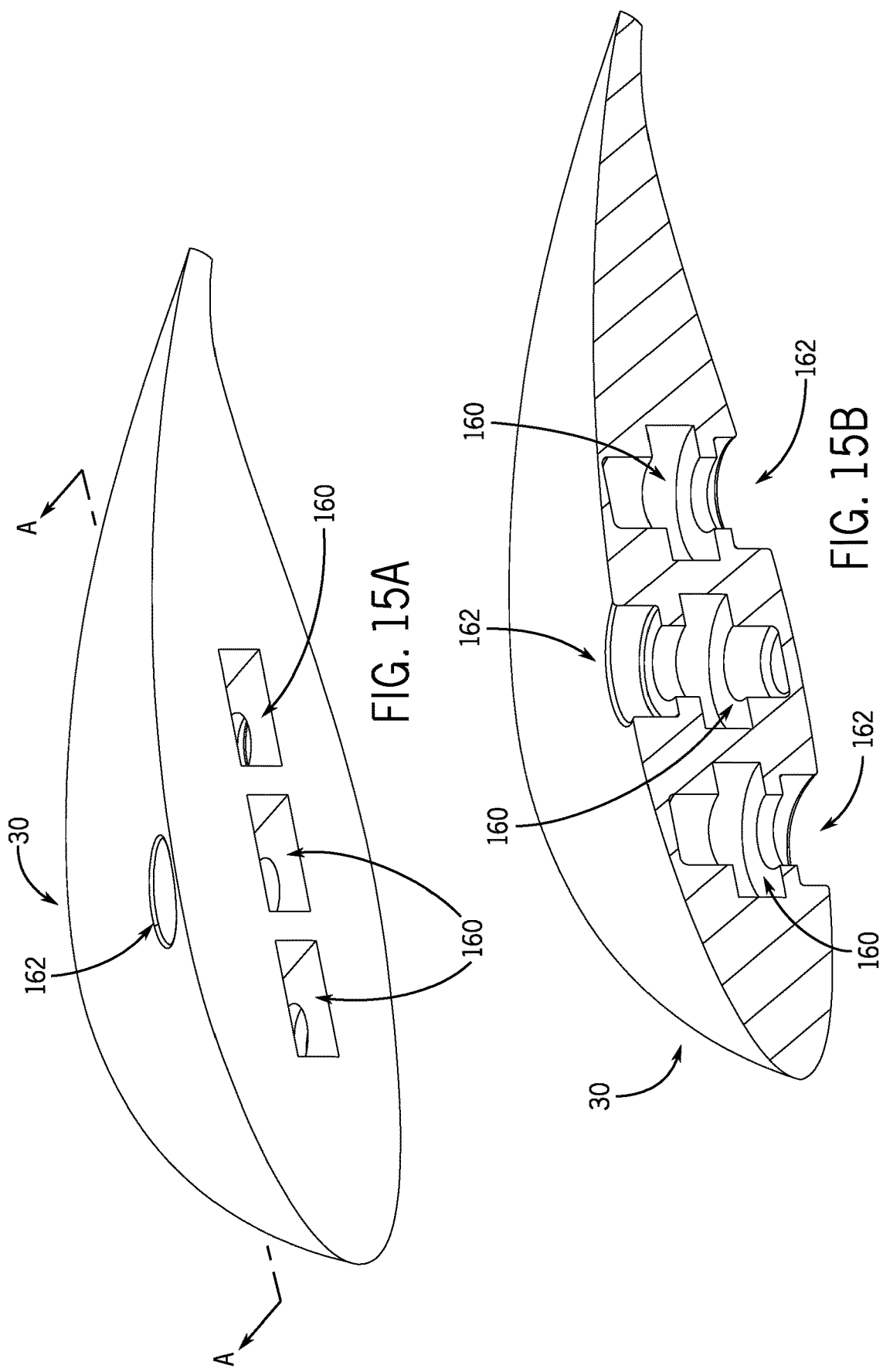

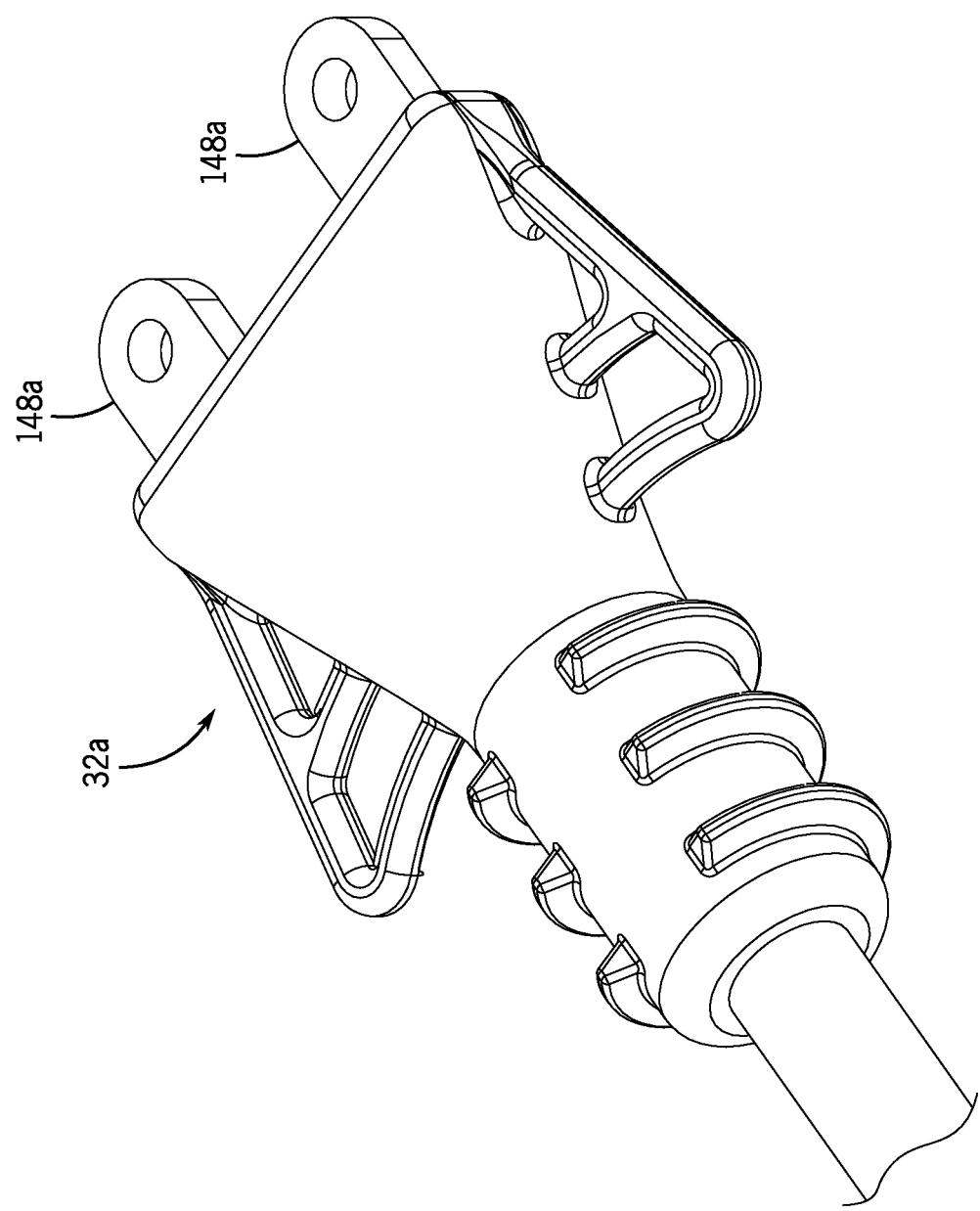

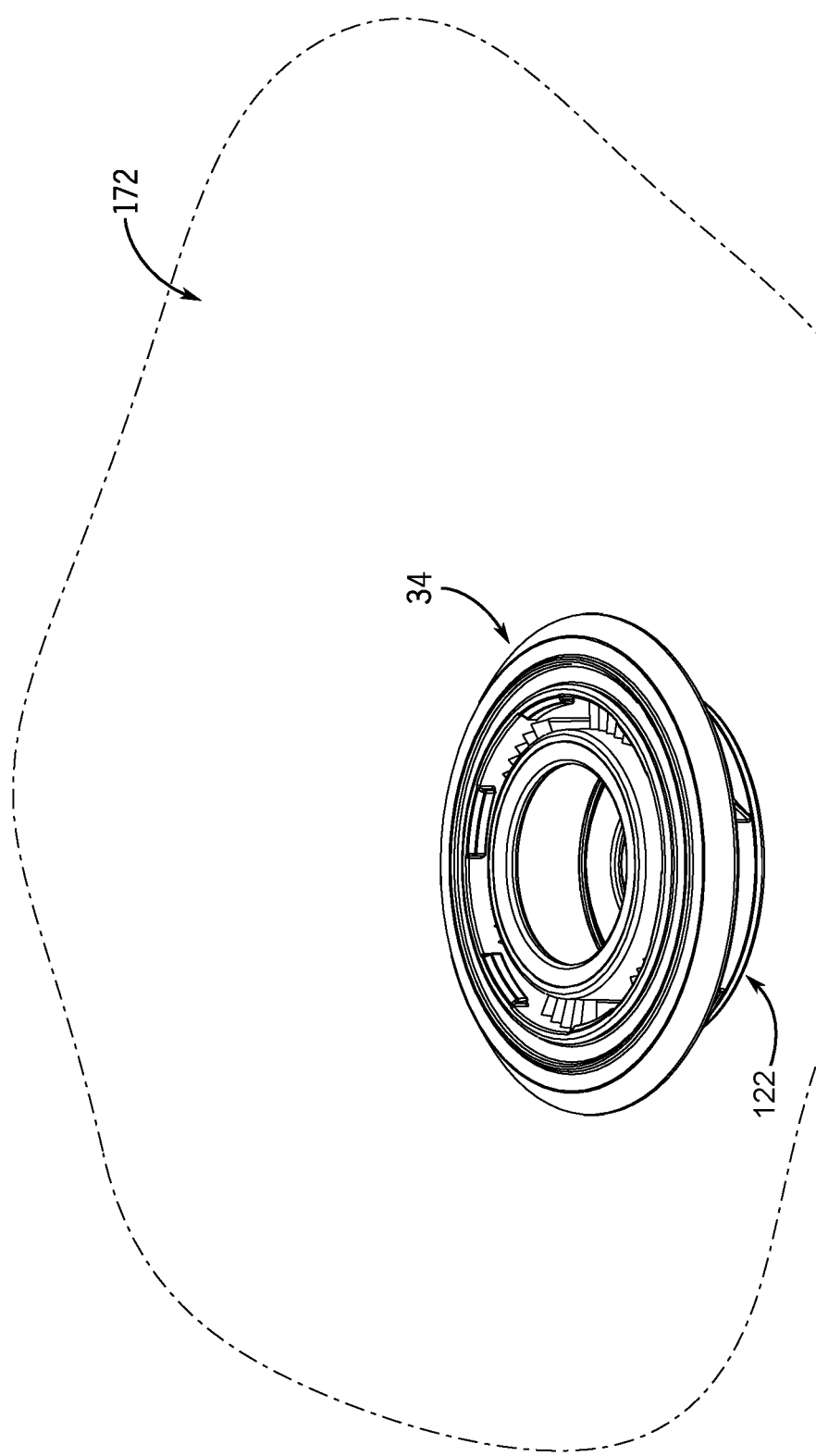

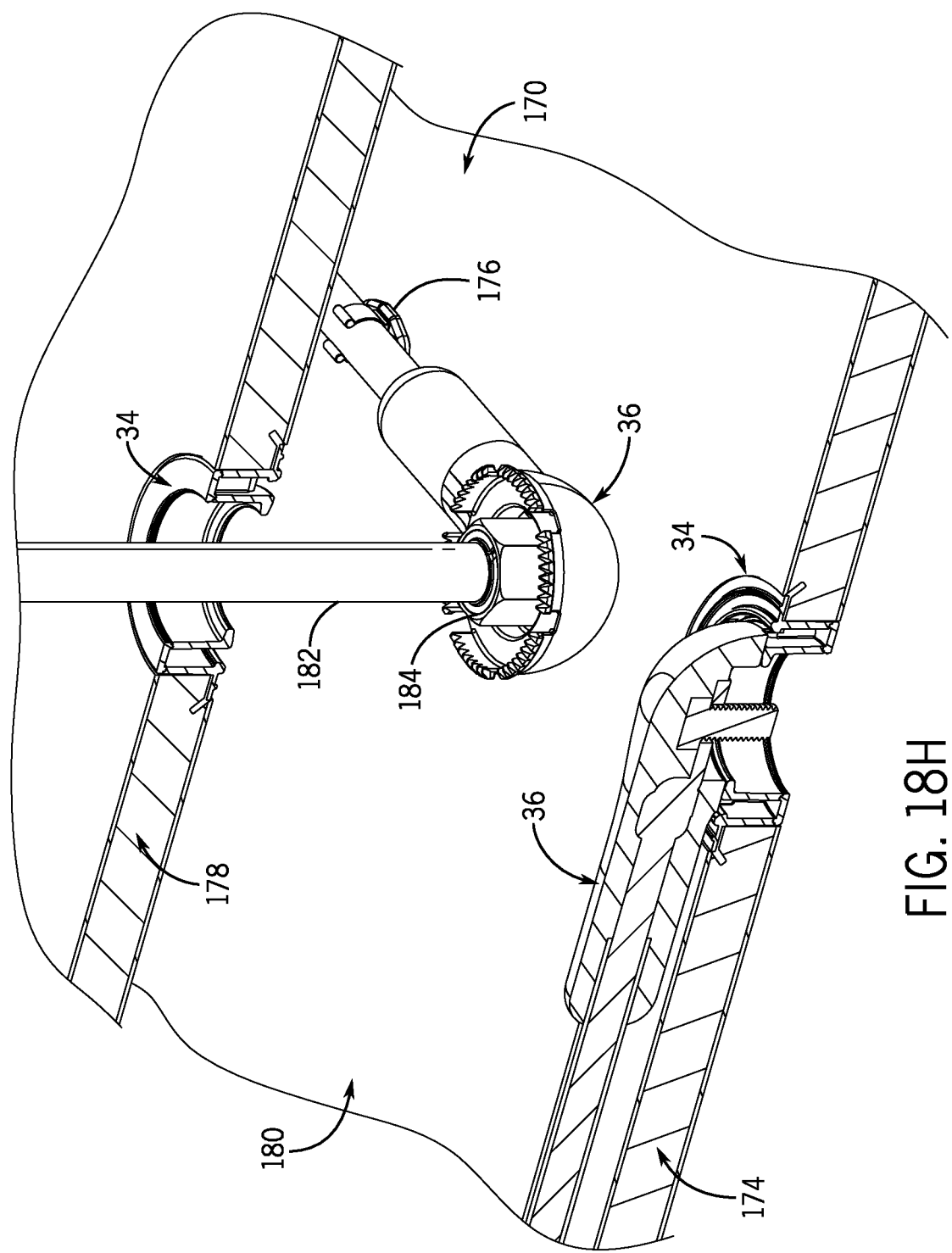

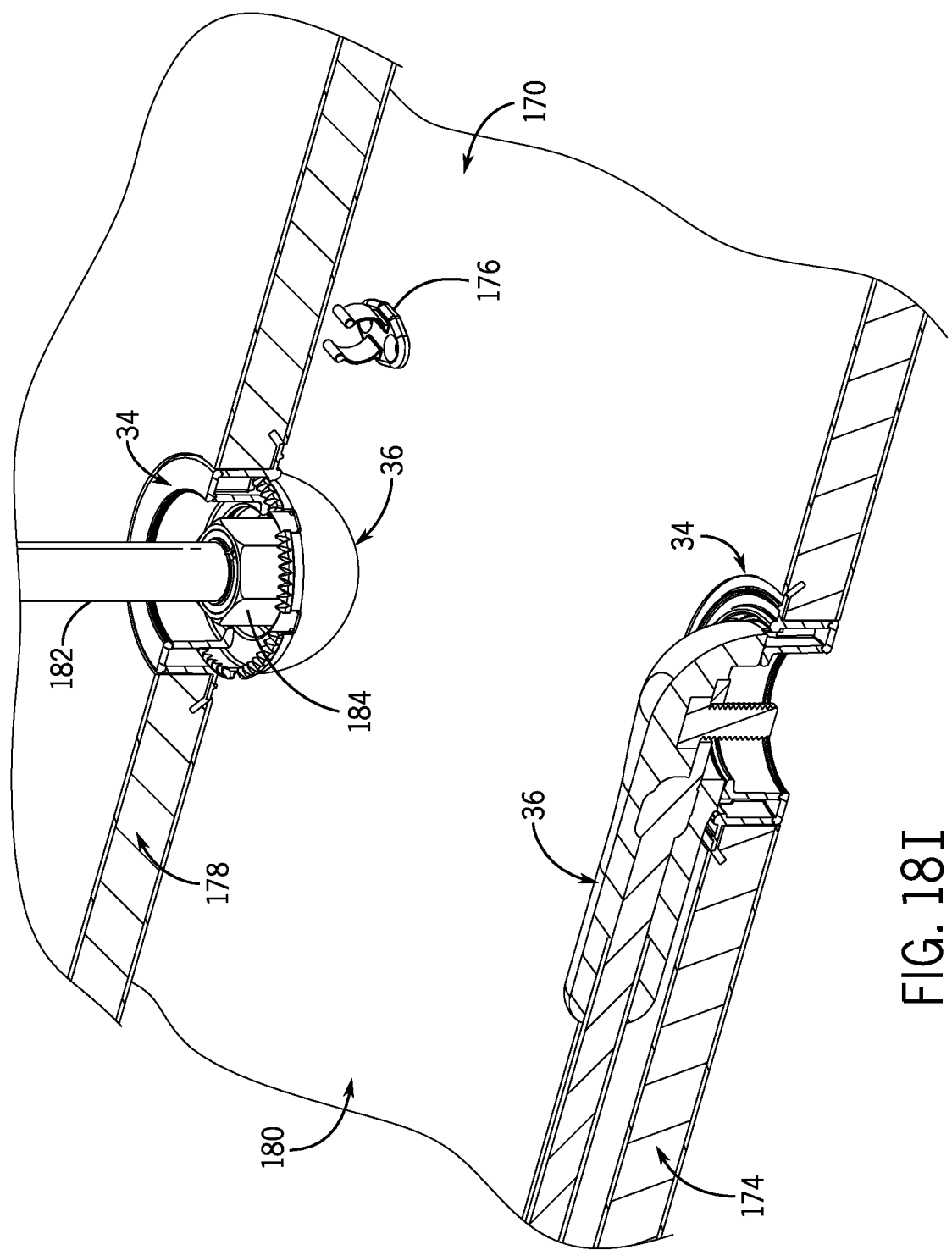

LIGHTNING PROTECTION SYSTEM AND METHOD FOR WIND TURBINE BLADES

CROSS-REFERENCE TO RELATED APPLICATIONS

This application is a divisional of and claims priority to U.S. patent application Ser. No. 15/153,978, filed on May 13, 2016, the entirety of which is incorporated herein by reference.

BACKGROUND

Wind turbines and other structures can be subject to lightning strikes, which can potentially damage the structures themselves, damage electronic or other components supported by the structures, or result in other detrimental effects. Accordingly, it can be useful to provide wind turbines and other structures with lightning protection systems in order to appropriately route electrical current from lightning strikes to the ground.

Conventional lightning protection systems for wind turbines generally adopt one or more of three approaches for protecting wind turbine blades (here, generally, "blades") from lightning strikes. A first conventional approach uses tip receptors, which are generally configured as cylindrical conductors that protrude through the distal fins of respective blades, or as conductive end caps that generally match the relevant blade profiles. Generally, a tip receptor is connected to a down conductor, or earthing electrode, which extend from a connection of the down conductor with the tip receptor, through an internal cavity of the turbine blade, to the blade root. Some conventional designs can also use an anchoring block, also referred to as a receptor block, that can be located within the blade cavity some distance away from the blade tip and can provide an electro-mechanical bonding junction for the tip receptor and the down conductor.

A second conventional approach uses conductive surface receptor disks, each with a respective exposed face and receptor body. A receptor body is generally recessed into the relevant blade wall and can sometimes extend into the relevant blade cavity. Generally, the exposed face of a receptor disk is circular, while the shape of the receptor body can vary. In some installations, receptor disks are disposed near the trailing edge of a blade. In some installations, several receptor disks can be arranged at various points along the length of the blade, with the number of receptor disks dependent upon the length of the blade. In some installations, sets of receptor disks can be disposed near the tip of a blade in lieu of a tip receptor (e.g., as described above).

A third conventional approach uses blade coverings, which are generally configured as conductive layers that extend over a relatively large area of the surface of a blade. The layers of the blade coverings can be formed as continuous solids, meshes, or cured resins. Generally, the blade coverings are applied in sheets, strips or patches, and can be placed on the exterior surface of a blade or just below a surface coating of the blade.

SUMMARY

Some embodiments of the invention provide a lightning protection system for a wind turbine blade with a blade wall and a blade cavity. A socket can be configured to extend at least partly through the blade wall, and can include a socket body and a plurality of first teeth. A receptor plug can be configured to be secured to the socket with the receptor plug disposed at least partly within the blade cavity, and can include a plug body, a plug conductor at least partly enclosed by the plug body, and a plurality of second teeth. The plurality of first teeth can engage the plurality of second teeth, when the receptor plug is secured to the socket, to resist rotation of the receptor plug relative to the socket.

Some embodiments of the invention also provide a lightning protection system for a wind turbine blade with a blade wall and a blade cavity. A socket can be configured to extend at least partly through the blade wall, and can include a non-conductive socket body with an opening and a first retention shoulder. A receptor plug can include a non-conductive plug body, a plug conductor at least partly enclosed by the non-conductive plug body, and a second retention shoulder. A receptor element can be configured to connect to the receptor plug to transmit current from lightning strikes to the plug conductor. The second retention shoulder can engage the first retention shoulder to secure the receptor plug to the socket, with the non-conductive plug body disposed at least partly within the blade cavity. The receptor element can connect to the receptor plug, when the receptor plug is secured to the socket, via the opening in the non-conductive socket body.

Some embodiments of the invention provide a lightning protection system for a wind turbine blade with a tip receptor that includes a conductive body with a receptor profile. A tip receptor mount can include a receptor mount body, at least two bonding wings, a conductor, and a conductive connector. Each of the bonding wings can extend away from the receptor mount body, and can include a respective non-conductive lattice. The conductor can be at least partly included in the receptor mount body. The conductive connector can extend at least partly outside of the receptor mount body. The tip receptor can be secured to the tip receptor mount with the conductive connector. The bonding wings can be secured to the wind turbine blade with a bonding material that at least partly fills the non-conductive lattices.

Some embodiments of the invention provide a method of installing a lightning protection system in a blade wall formed on a blade mold, where the lightning protection system includes a receptor plug, a receptor element, and a socket with a bottom wall. The bottom wall of the socket can be placed on the mold. The blade wall can be formed on the mold so that the blade wall is formed around, and at least partly includes, the socket. At least part of the bottom wall of the socket can be removed to provide an opening through the blade wall via the socket. The receptor plug can be secured to the socket, with the receptor plug on an interior side of the blade wall. After the at least part of the bottom wall is removed, the receptor element can be secured to the receptor plug via the opening.

Some embodiments of the invention provide a method of installing a lightning protection system in a wind turbine blade with a first blade wall formed on a first blade mold, a second blade wall formed on a second blade mold, and a blade cavity formed when the first blade wall is secured to the second blade wall, where the lightning protection system includes a first socket with a first bottom wall, a second socket with a second bottom wall, a first receptor plug, a second receptor plug, a first receptor element, and a second receptor element. The first bottom wall of the first socket can be placed on the first blade mold. The first blade wall can be formed on the first blade mold so that the first blade wall is formed around and at least partly includes the first socket. At least part of the first bottom wall of the first socket can be removed to provide a first opening through the first blade wall via the first socket. The first receptor plug can be secured to the first socket with the first receptor plug on an interior side of the first blade wall. The second receptor plug can be temporarily secured to the interior side of the first blade wall.

The second bottom wall of the second socket can be placed on the second blade mold. The second blade wall can be formed on the second blade mold so that the second blade wall is formed around and at least partly includes the second socket. The first blade wall can be joined to the second blade wall to form the blade cavity. At least part of the second bottom wall of the second socket can be removed to provide a second opening through the second blade wall via the second socket.

After removing the at least part of the first bottom wall, the first receptor element can be secured to the first receptor plug via the first opening. After removing the at least part of the second bottom wall, the second receptor plug can be accessed via the second opening to remove the second receptor plug from the first blade wall and secure the second receptor plug to the second socket. The second receptor element can be secured to the second receptor plug via the second opening.

Some embodiments of the invention provide a method of installing a lightning protection system in a blade wall formed on a mold, where the lightning protection system includes a receptor plug, a receptor element, and a socket with a bottom wall. The bottom wall of the socket can be placed on the mold. The blade wall can be formed on the mold so that the blade wall is formed around and at least partly includes the socket. At least part of the bottom wall of the socket can be removed to provide an opening through the blade wall via the socket. The receptor plug can be secured to the socket with the receptor plug on an interior side of the blade wall. After removing at least part of the bottom wall, the receptor element can be secured to the receptor plug via the opening.

Some embodiments of the invention provide a method of installing a lightning protection system in a wind turbine blade with a first blade wall formed on a first blade mold, a second blade wall formed on a second blade mold, and a blade cavity formed when the first blade wall is secured to the second blade wall. A first bottom wall of a first socket can be placed on the first blade mold. The first blade wall can be formed on the first blade mold so that the first blade wall is formed around and at least partly includes the first socket. After forming the first blade wall, a first opening can be provided through the first blade wall via the first bottom wall of the first socket. A first receptor plug can be secured to the first socket with the first receptor plug at least partly disposed on an interior side of the first blade wall.

A second bottom wall of a second socket can be placed on the second blade mold. The second blade wall can be formed on the second blade mold so that the second blade wall is formed around and at least partly includes the second socket. The first blade wall can be joined to the second blade wall to form the blade cavity with the second receptor plug disposed within the blade cavity. After forming the second blade wall, a second opening can be provided though the second blade wall via the second bottom wall of the second socket. The second receptor plug can be accessed via the second opening to secure the second receptor plug to the second socket.

Some embodiments of the invention provide a method of installing a lightning protection system in a wind turbine blade. A first blade wall can be formed around a first socket so that an integrally formed first socket wall of the first socket separates a first internal opening of the first socket from an exterior side of the first blade wall. At least part of the integrally formed first socket wall can be removed to provide a first opening through the first blade wall into the first internal opening of the first socket. A first receptor plug can be secured to the first socket with the first receptor plug at least partly disposed to an interior side of the first blade wall. A first receptor element can be secured to the lightning protection system to provide a conductive path from the exterior side of the first blade wall to the first receptor plug via the first internal opening of the first socket.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIGS. 3A through 3D are bottom plan, side elevation, top plan, and front elevation views, respectively, of a side receptor plug for use with the lightning protection system of FIG. 1;

FIGS. 4A and 4B are bottom, front, left perspective and top, front, right perspective views, respectively, of the side receptor plug of FIGS. 3A through 3D;

FIGS. 6A through 6C are bottom plan, side elevation, and top plan views, respectively, of a socket for use with the lightning protection system of FIG. 1;

FIGS. 12A through 12C are a side elevation, top plan, and front elevation views, respectively, of a tip receptor mount for use with the lightning protection system of FIG. 1;

FIG. 15A is a bottom, rear, left perspective view of a tip receptor for a wind turbine blade;

FIG. 15B is a bottom, rear, left sectional perspective view of the tip receptor of FIG. 15A, taken along plane A-A of FIG. 15A

FIG. 17 is a top, left, rear perspective view of another tip receptor mount for use with the lightning protection system of FIG. 1; and FIGS. 18A through 18K illustrate an installation method for parts of the lightning protection system of FIG. 1.

DETAILED DESCRIPTION

Figure 1:
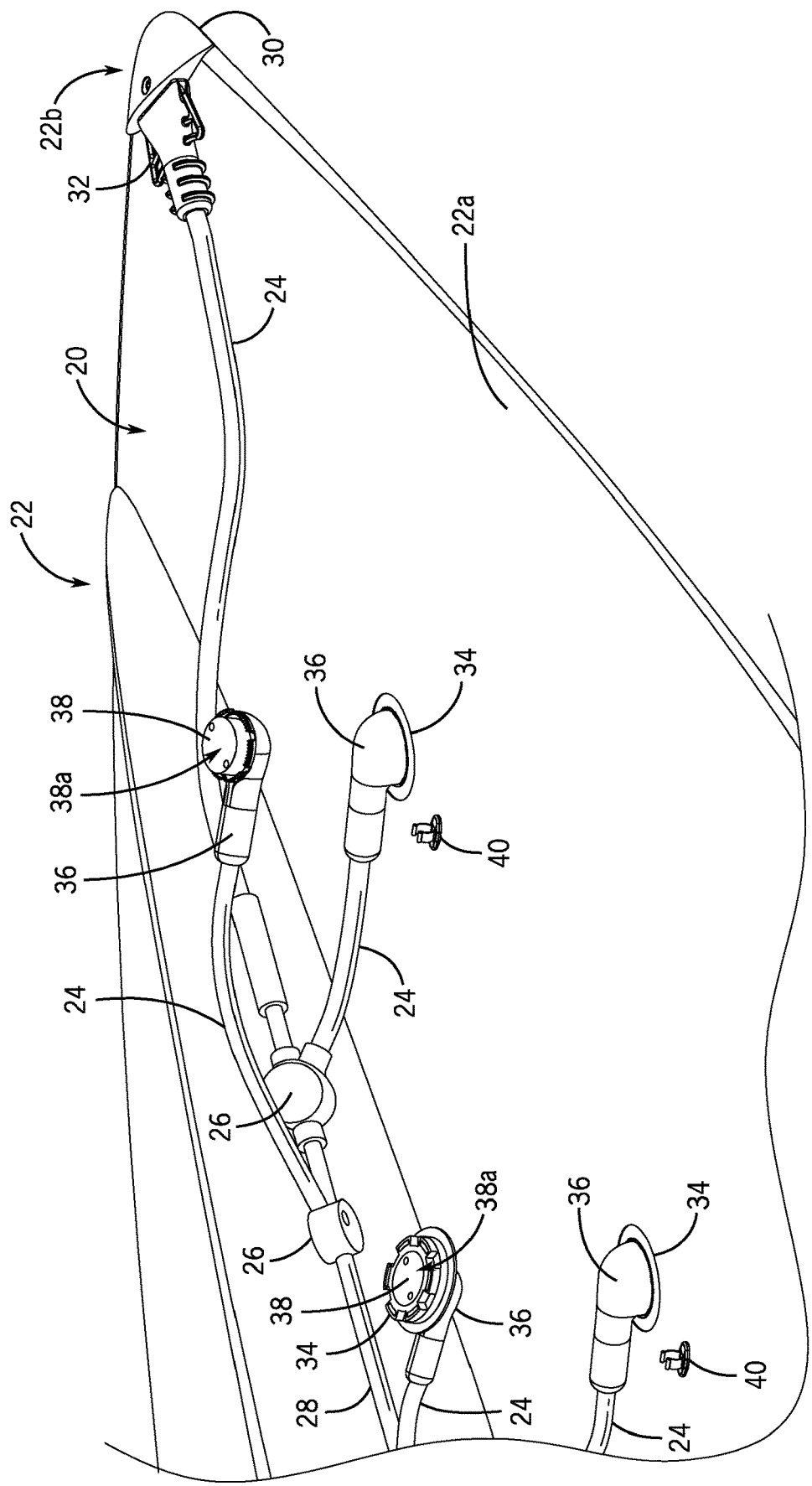
FIG. 1 is a perspective view of part of a wind turbine blade and a lightning protection system for the blade, according to some embodiments of the invention, with a top portion of the blade removed to show aspects of the lightning protection system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings. For example, in some cases, "connected" elements can be electrically connected, including through direct contact or through an intermediary object or medium.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some figures may include multiple instances of similar structures or structural relationships. For convenience of presentation, in select figures, only some of these similar structures or relationships may be specifically labeled with a reference number. One of skill in the art will recognize that the features not labeled with reference numbers can include similar aspects and perform similar functions to similar features that are labeled with reference numbers.

In discussion of certain figures, directional references such as up, down, top, bottom, left, right, and so on may be used. Unless otherwise specified, these references are provided for convenience only, and with respect only to the particular figure(s) and embodiment(s) discussed.

Embodiments of the invention can improve on conventional lightning protection ("LP") systems in different ways. In the context of wind turbine blades (here, generally, "blades"), embodiments of the invention can reduce the difficulty of installation as compared to conventional lightning protection systems, as well as the need for significant post-processing work after the blades have been closed. For example, under one conventional installation process for conventional LP systems, a receptor block (e.g., solid piece of metal) is built into a blade cavity. Once the blade has been closed, the receptor block must be located and then drilled and tapped so that a receptor disk (or other receptor element) can be secured to the metal piece. This process can be relatively difficult and time consuming. In another conventional installation process for conventional LP systems, a hole must be cut into a blade wall once the blade has been closed. Once the hole has been cut, a conductive connection is made through the cut hole, and the hole then patched to re-finish the blade. Again, this process can be relatively difficult and time consuming.

Some embodiments of the invention can provide a LP system that can not only generally reduce the difficulty of the installation process, but also significantly reduce the need for post-processing work that may be required under conventional LP systems. For example, embodiments of the invention can include sockets that can be molded into blade walls as the blade walls are being formed. Once the blades have been formed, a part of the sockets can be removed in order to provide consistent, engineered mounting holes through the blade walls for securing and connecting receptor disk. Further, the sockets can provide for relatively easy attachment of associated plugs, in order to transmit electrical current from the receptor disks to the relevant down conductor. As such, through use of the sockets, receptor disks can be installed to blades, and can be electrically connected to down connectors, without the need to cut and repair (or otherwise post-process) the blades.

In some embodiments of the invention, a LP system can include a tip receptor mount that can be easily adapted to attach to, and conduct electrical current from, a variety of different tip receptors. This can allow for tip receptors to be customized to particular blade profiles, without necessarily requiring significant reconfiguration of the associated tip receptor mounts. Further, the tip receptor mount can include non-conductive bonding features, such as bonding wings with a non-conductive lattice, to receive bonding material (e.g., resin) in order to help secure the tip receptor mount to a blade.

Some embodiments of the invention can provide a method of installation for LP systems that improves on conventional installation methods. For example, multiple sockets (e.g., sockets as described generally above) can be molded into blade walls for both sides of a blade. A number of plugs with conductors can be installed into sockets on a first side of the blade, and additional plugs can be temporarily attached to the interior of the first side of the blade using adhesives, clips, or other mechanisms. The blade can then be closed by joining the blade walls together. Once the blade is closed, the plugs that are attached to the interior of the first side of the blade with the adhesive, clips or other mechanisms can be visually located through openings in sockets on the second side of the blade. A relatively simple tool can then be extended through the openings to grab these plugs, remove them from the temporary attachment at the first side of the blade, and attach them to sockets on the second side of the blade. Each plug that has been connected to a socket can then be connected to a receptor disk, which can be installed, via the plug, flush with the exterior surface of the blade.

In the discussion below, various examples discuss LP systems according to the invention in the context of conventional wind turbine blades. It will be understood that this discussion is presented by way of example only, and that the disclosed invention can also be used beneficially in other settings.

FIG. 1 illustrates an LP system 20 according to one embodiment of the invention. In the embodiment illustrated, the LP system 20 is installed in a blade 22 with a bottom wall 22a and a top wall (not shown for clarity), which can be separately molded then joined together into the blade 22. Generally, the LP system 20 includes a number of receptors for lightning strikes, which are connected by conductors 24 and by various junctions 26 to a down conductor 28. At a distal tip 22b of the blade 22, the LP system 20 includes a metal tip receptor 30. The tip receptor 30 is generally shaped to match the local profile of the blade 22 and provides a conductive receptor surface on the exterior of the blade 22 to receive lightning strikes. The tip receptor 30 is secured to a tip receptor mount 32, which is connected by one of the conductors 24 to the down conductor 28.

In addition to the tip receptor 30, the LP system 20 also includes a plurality of side receptors, each including a respective socket 34 mounted to the relevant wall of the blade 22, a side receptor plug 36 secured to the socket 34, and a side receptor disk 38 secured to the side receptor plug 36. (As illustrated in FIG. 1, one of the side receptors is shown without a socket 34, to illustrate aspects of the attachment of the relevant side receptor plug 36 to the relevant side receptor disk 38.) Generally, the pairs of the side receptor plugs 36 and the sockets 34 hold the respective side receptor disk 38 with a receptor surface 38a of the side receptor disk 38 facing outside of, and flush (i.e., substantially in parallel) with, the relevant wall of the blade 22. One of the conductors 24 extends from each of the side receptor plugs 36 to connect the side receptors to the down conductor 28.

FIG. 1 also illustrates a number of clips 40 secured to the interior of the walls of the blade 22. As also discussed below, the clips 40 can be used during installation of the LP system 20 in the blade 22.

Figure 2:
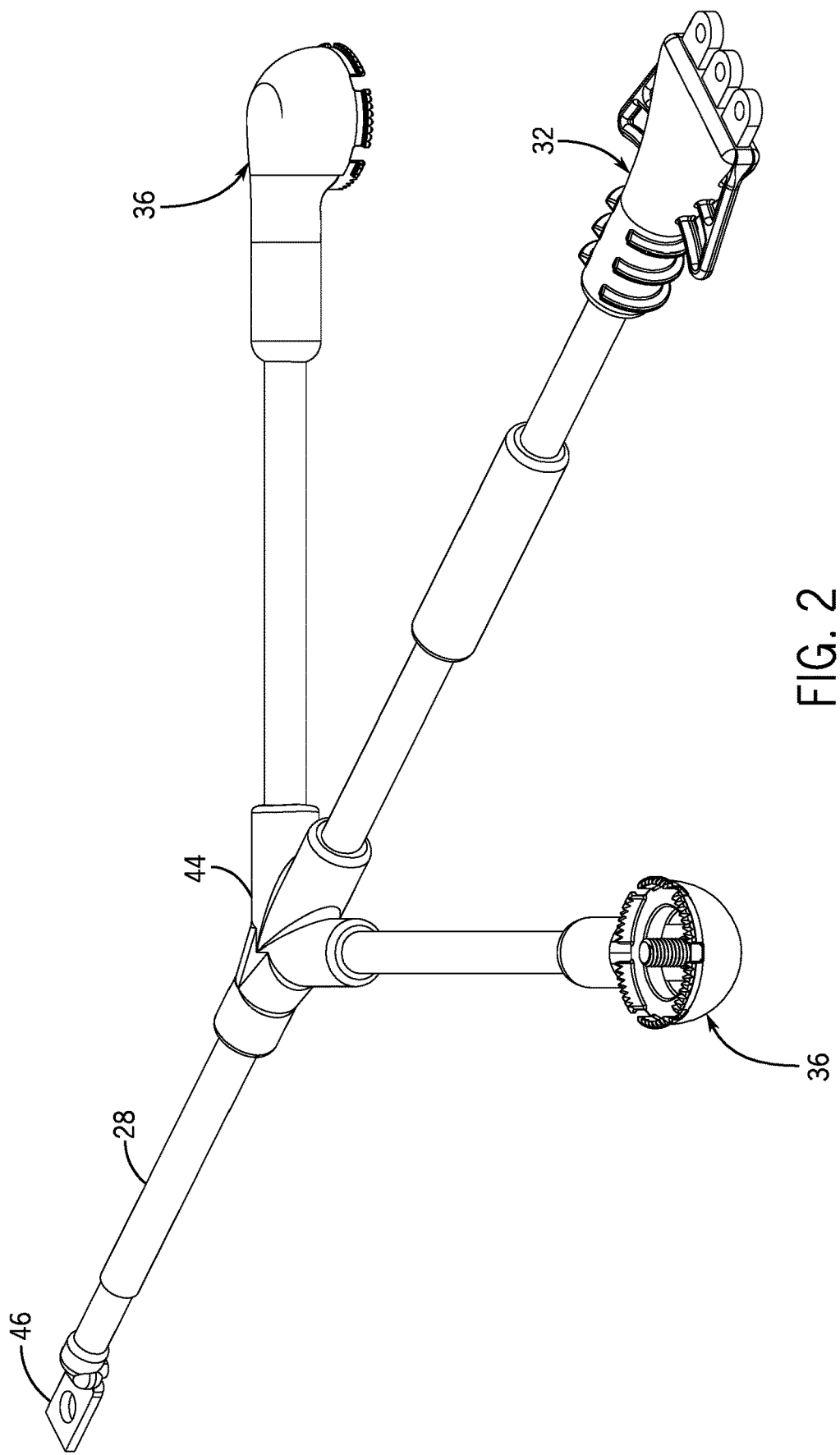
FIG. 2 is a perspective view of a branch for use with the lightning protection system of FIG. 1, including two side receptor plugs and a tip receptor mount

It will be understood that the configuration illustrated in FIG. 1 is presented as an example only, and that other embodiments of the disclosed LP system can include other numbers or arrangements of side receptor plugs, tip receptors, cables, junctions, and other components. In general, FIG. 2 illustrates a "W-splice" configuration that can be used in the LP system 20 or in various other LP systems. In the embodiment illustrated, the W-splice configuration can include two of the side receptors (each with a respective one of the side receptor plugs 36) and one of the tip receptor mounts 32 joined to the down conductor 28 with a junction 44. As also illustrated in FIG. 2, connectors such as a lug 46 can be included to help the conductor 28 (or other components) mechanically attach and transfer electrical current to other parts of the system.

In the embodiment illustrated in FIG. 2, one of the side receptor plugs 36 is arranged to be secured to one side of a blade and another of the side receptor plugs 36 is arranged to be secured to an opposite side of the blade. Accordingly, using the embodiment illustrated in FIG. 2, receptors for lightning strikes can be disposed on both sides of a blade (as well as at the blade tip).

In other embodiments, other configurations are possible. For example, for some blade assemblies, appropriate LP systems can include conductors of 30-50 meters or more, and can employ significantly more than two side receptors. In some embodiments, an individual Y-splice connection for each side receptor branch can be used (e.g., a Y-splice connection for each pair of side receptors), as an alternative (or in addition to) the W-splice configuration illustrated in FIG. 2.

FIGS. 3A through 5A illustrate various aspects of one of the side receptor plugs 36 of FIG. 1. In the embodiment illustrated, the side receptor plug 36 includes an overmolded body 60 with a generally semi-spherical shell portion 62 and a generally cylindrical neck portion 64. The overmolded body 60 is generally formed from a non-conductive (e.g., plastic) material in order to discourage lightning attachment to conductive elements internal to the blade 22, and to generally act as an insulator for electrical current moving through the LP system 20.

Generally, the shell portion 62 of the overmolded body 60 includes an open end 66, with a set of retention tabs 68 arranged circumferentially around a shoulder 58 within the open end 66. The retention tabs 68 are generally separated from each other by gaps 70, so that the retention tabs 68 do not extend continuously around the circumference of the open end 66. In the embodiment illustrated, the gaps 70 are generally smaller in circumferential extent than the retention tabs 68. Further, the gaps 70 and the retention tabs 68, respectively, have generally similar circumferential extent to each other. It will be understood, however, that other configurations are possible. For example, a single retention tab (not shown) of partial or full circumferential extent can be used in place of (or in addition to) the retention tabs 68.

To help secure the side receptor plug 36 to one of the sockets 34 (as also discussed below), each of the retention tabs 68 includes a radially outwardly extending retention shoulder 72. Further, a plurality of teeth 74 extend from free ends of the respective retention tab 68 away from the open end 66. As illustrated, the teeth 74 are configured as generally triangular teeth with pointed ends, collectively arranged in a single, circumferential array. In other embodiments, other configurations are possible. For example, teeth for a receptor plug can alternatively (or additionally) include rounded teeth, square teeth, teeth arranged in a set of circumferential arrays (e.g., each at a different radial distance from a reference axis), and so on.

To provide a conductive path through the side receptor plug 36, a connector, such as a bolt 76, is seated within (e.g., molded into) the shell portion 62 and is in contact with a shell plate 78 also seated within the shell portion 62. The shell plate 78 is partly disposed in an open internal cavity of the shell portion 62 and is separated from the retention tabs 68 by a shoulder at the open end 66 of the shell portion 62. The shell plate 78 is in conductive contact with a conductor such as a cable 80 extending through the neck portion 64 (see FIG. 5A) in order to electrically connect the side receptor plug 36 to a down conductor (not shown in FIGS. 3A through 5A). As also described below, the bolt 76 can be used to secure one of the side receptor disks 38 (not shown in FIGS. 3A through 5A) to the side receptor plug 36. Accordingly, electrical current (e.g., due to a lightning strike at the side receptor disk 38) that enters the side receptor plug 36 via contact between the relevant side receptor disk 38 and the shell plate 78 (or otherwise) can be transmitted through and out of the side receptor plug 36 via the shell plate 78, the exothermic weld connection 82 (or the compression lug 88), and the cable 80.

It will be understood that other configurations are possible for securing the side receptor disks 38 to the side receptor plugs 36. For example, instead of a threaded bolt such as the bolt 76, the side receptor disks 38 can include other types of attachment devices, such as acorn/cap nuts, blind press nuts, blind weld nuts, and so on. Similarly, the side receptor disks 38 can include attachment devices other than tapped holes. For example, other side receptor disks can be configured with integral threaded bolt features (not shown), that can engage a corresponding tapped hole in a corresponding side receptor plug (not shown).

Figure 5A:
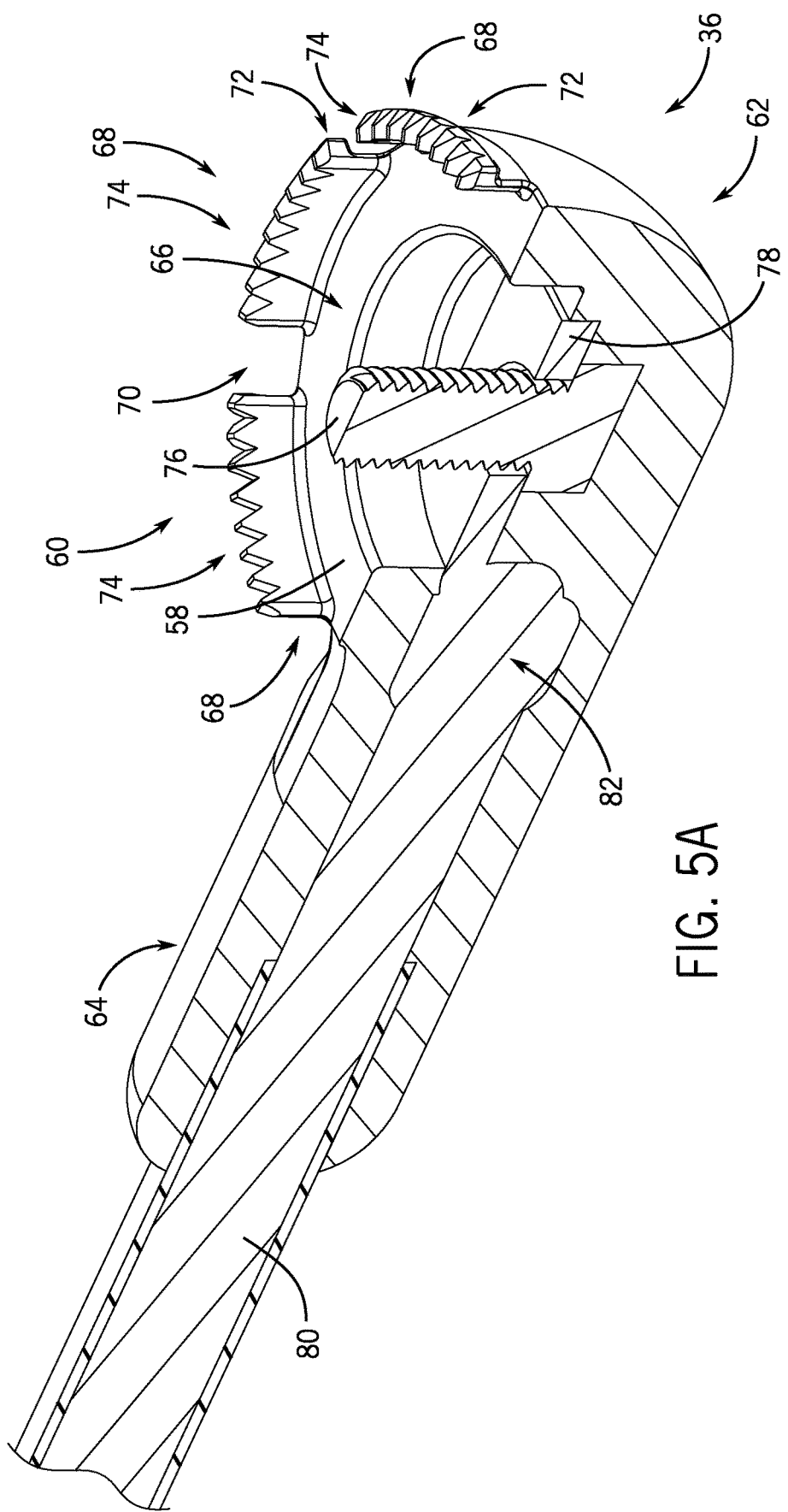
FIG. 5A is a bottom, front, left sectional perspective view of the side receptor plug of FIGS. 3A through 3D.
Figure 5B:
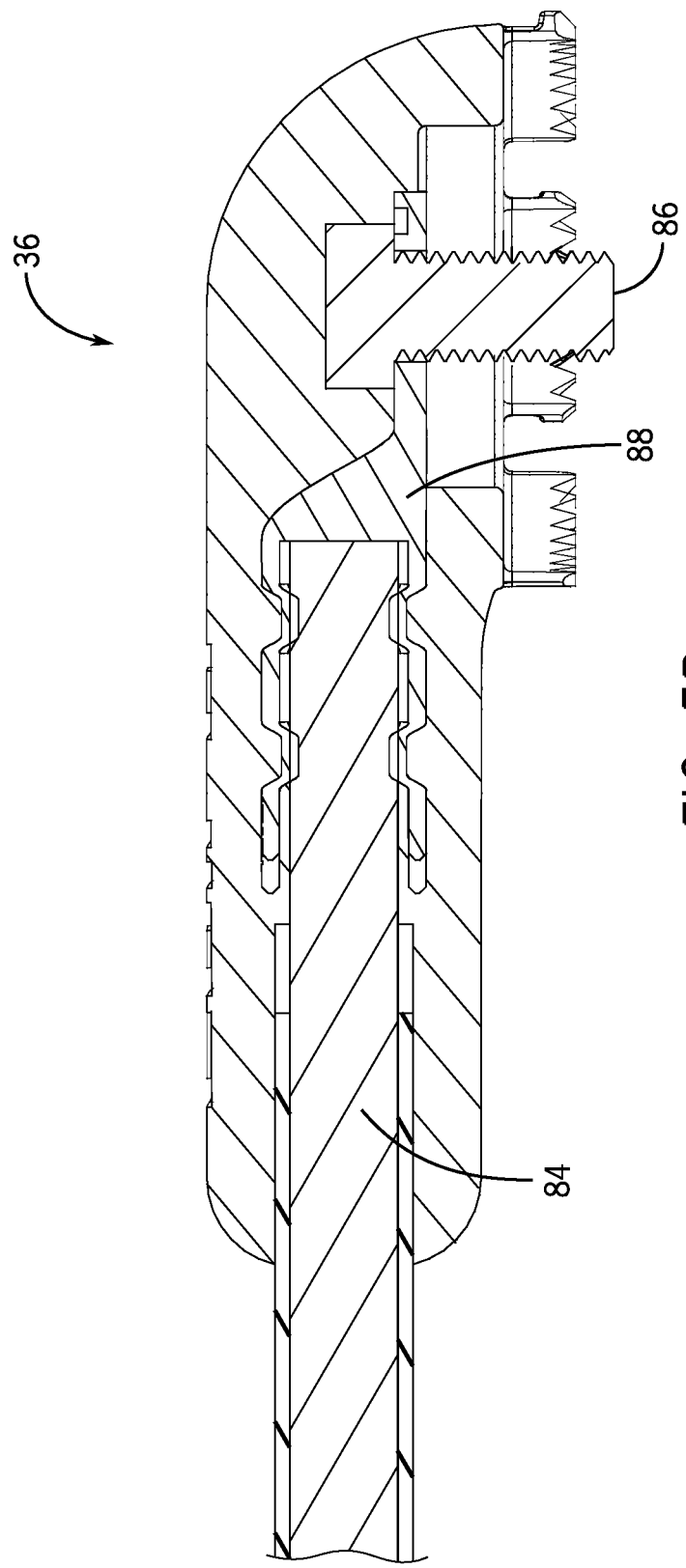
FIG. 5B is a side sectional view of another side receptor plug for use with the lightning protection system of FIG. 1.

In the embodiment illustrated in FIG. 5A, the cable 80 is configured as a copper cable that can be secured to the shell plate via an exothermic weld connection 82. This may be useful, for example, because exothermic connections are generally low resistance, do not loosen or corrode over time, and exhibit a generally smaller profile than comparable bolted cable lugs and crimped connections. In other embodiments, however, other configurations for conductive connections are possible. For example, as illustrated in FIG. 5B, one or more of the side receptor plugs 36 can include an aluminum (or other) cable 84 that can be connected to a bolt 86 using a compression lug 88 or other mechanical connector.

FIGS. 6A through 8 illustrate various aspects of one of the sockets 34 of FIG. 1, which is generally configured to attach to the side receptor plug 36 of FIGS. 3A through 5A. In the embodiment illustrated in FIGS. 6A through 8, the socket 34 generally includes a cylindrical body 100, with an exterior perimeter flange 102. The perimeter flange 102 extends around the top end of the socket 34 and includes a lip 104 that angles generally outwardly from a perspective moving downward from the top of the socket (i.e., moving right to left in FIG. 6B). In the embodiment illustrated, the flange 102 is also connected to the cylindrical body 100 with various flat gussets 108. Like the side receptor plug 36, the socket 34 is generally formed from a non-conductive (e.g., plastic) material in order to discourage lightning attachment to conductive elements internal to the blade 22 and to generally act as an insulator for electrical current moving through the LP system 20.

The top of the socket 34 includes a central opening 106 divided by a cylindrical wall 110 into an internal cylindrical recess 112 and an external annular recess 114. A cylindrical flange 116 extends radially inwardly from the cylindrical wall 110 into the cylindrical recess 112. A series of retention shoulders 118 extend into annular recess 114, with a radial depth that is generally similar to the radial extension of the retention shoulders 72 (e.g., as illustrated in FIGS. 3A through 5A). Sets of teeth 120 with generally complimentary geometry to the teeth 74 (e.g., as illustrated in FIGS. 3A through 5A) are also disposed within the annular recess 114 at positions that are separated axially (i.e., into the page in FIG. 6C) from the retention shoulders 118.

Figure 7:
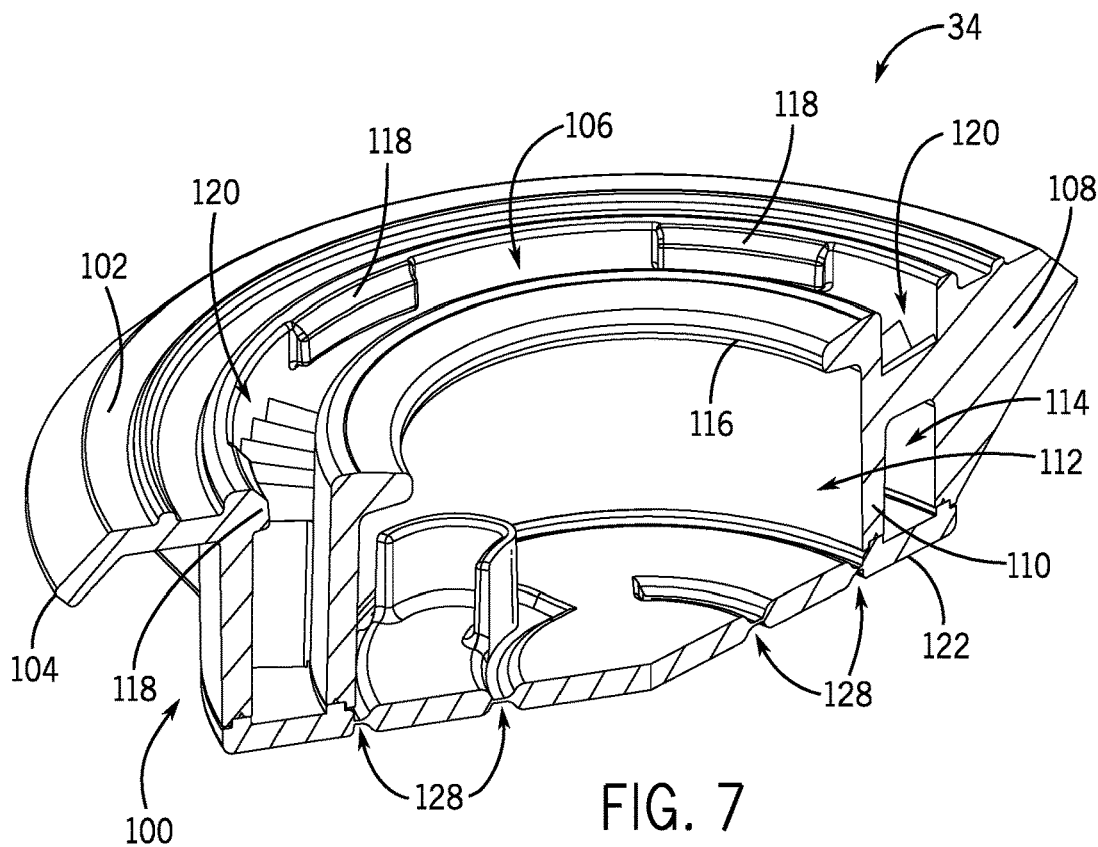
FIG. 7 is a top, left, front sectional perspective view of the socket of FIGS. 6A through 6C.
Figure 8:
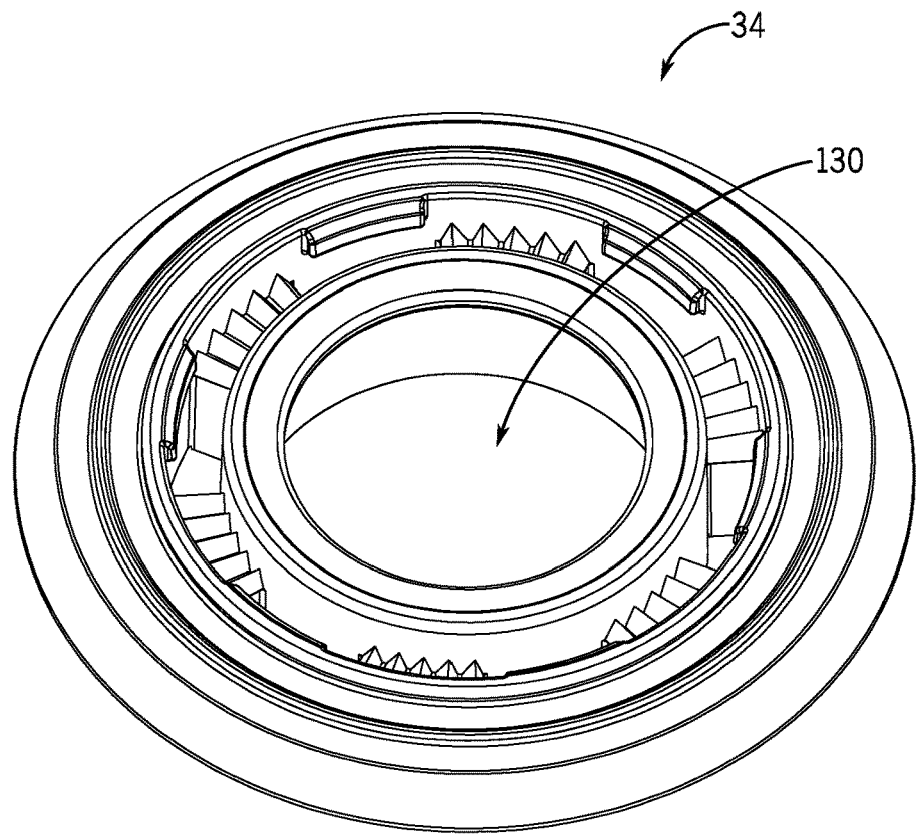
FIG. 8 is a top, left, front perspective view of the socket of FIGS. 6A through 6C, with a tear-away tab of the socket having been removed.

In an initial configuration (e.g., before installation), as illustrated in particular in FIGS. 6A, 6C and 7, the bottom of the socket 34 includes a bottom plate 122 that fully closes the bottom of the central opening 106, but also includes a tear-away tab 124. Generally, a tear-away tab can be configured to be relatively easily removed from the remainder of the bottom wall of a socket, at an appropriate time in the installation of the LP system 20 (e.g., as also discussed below), in order to provide an opening in the bottom of the socket 34 (see, e.g., FIG. 8). In the embodiment illustrated in FIGS. 6A, 6C, and 7, the tear-away tab 124 is configured for manual removal, with a gripping feature 126 and with a reduced-thickness tear-away profile 128 that extends within the perimeter of, and at least partly around, the tear-away tab 124. To remove the tear-away tab 124, a user can grasp the gripping feature 126 (e.g., with a tool) and pull generally axially relative to the socket 34. This can result in relatively the material of the socket 34 tearing away from the remainder of the bottom plate 122 along the tear-away profile 128, thereby allowing the tear-away tab 124 to be easily removed from the socket 34. As illustrated in FIG. 8, this can result in the central opening 106 extending axially through the entire body of the socket 34, via a generally circular hole 130 extending from the cylindrical recess 112 through the bottom plate 122 of the socket 34.

Figure 10:
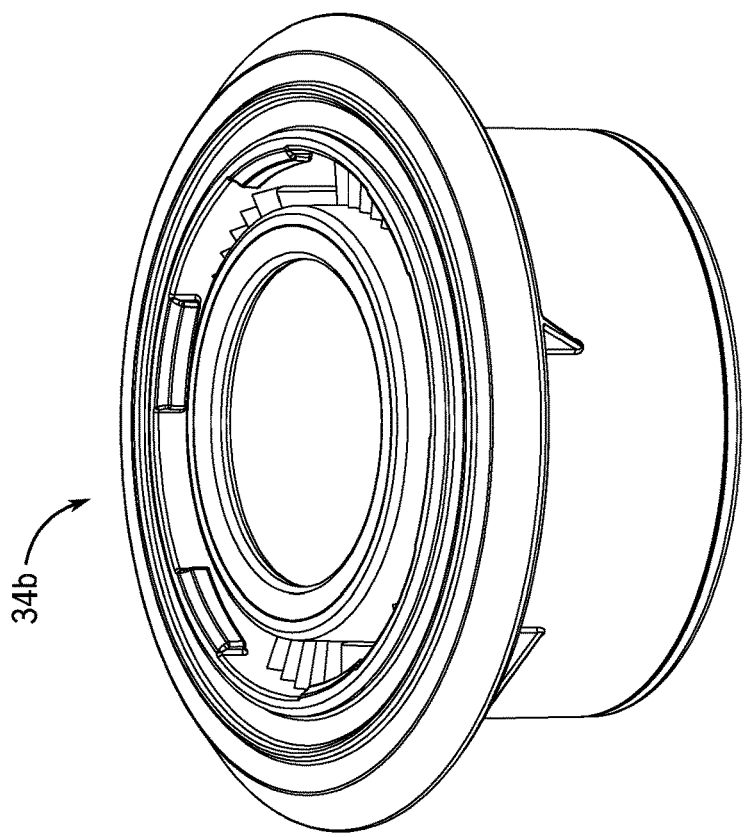
FIGS. 9 and 10 are top, left, front perspective views of additional sockets for use with the lightning protection system of FIG. 1.
Figure 9:
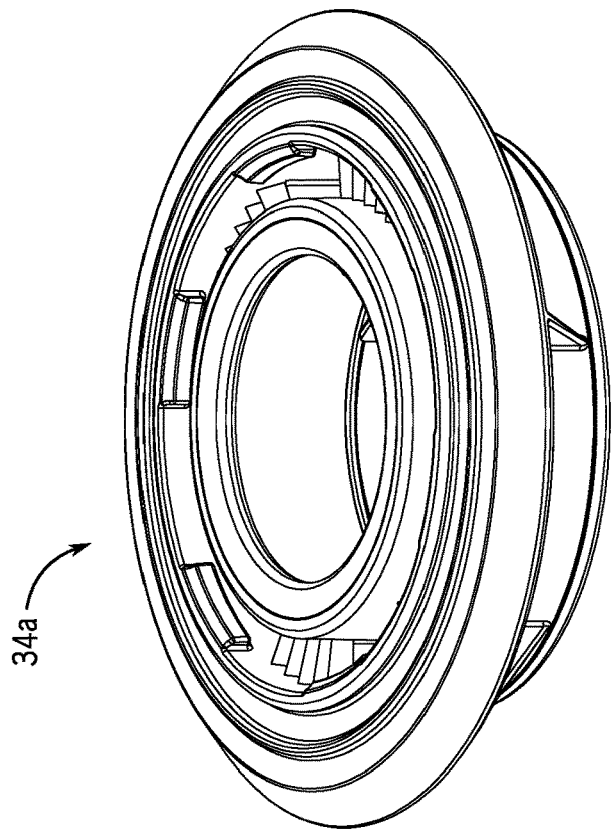

As also discussed below, the socket 34 (or other sockets according to this disclosure) can be molded into a particular blade wall as the blade wall is being formed. Accordingly, sockets of different thicknesses can be provided in order to accommodate blade walls of different thicknesses. As illustrated in FIGS. 9 and 10, for example, the sockets 34a and 34b are generally similar to the socket 34 illustrated in FIGS. 6A through 8, but exhibit a somewhat smaller height and a somewhat larger height, respectively, than the socket 34.

Figure 11B:
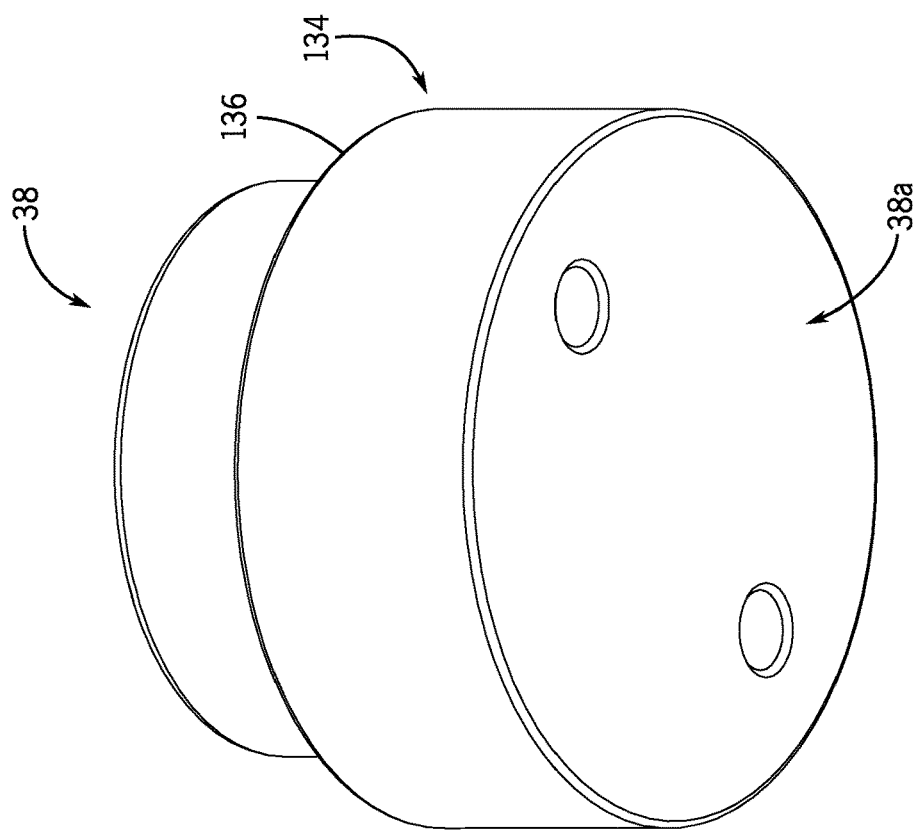
FIGS. 11A through 11C are top, bottom, and cross-sectional perspective views, respectively, of a side receptor disk for use with the lightning protection system of FIG. 1.
Figure 11A:
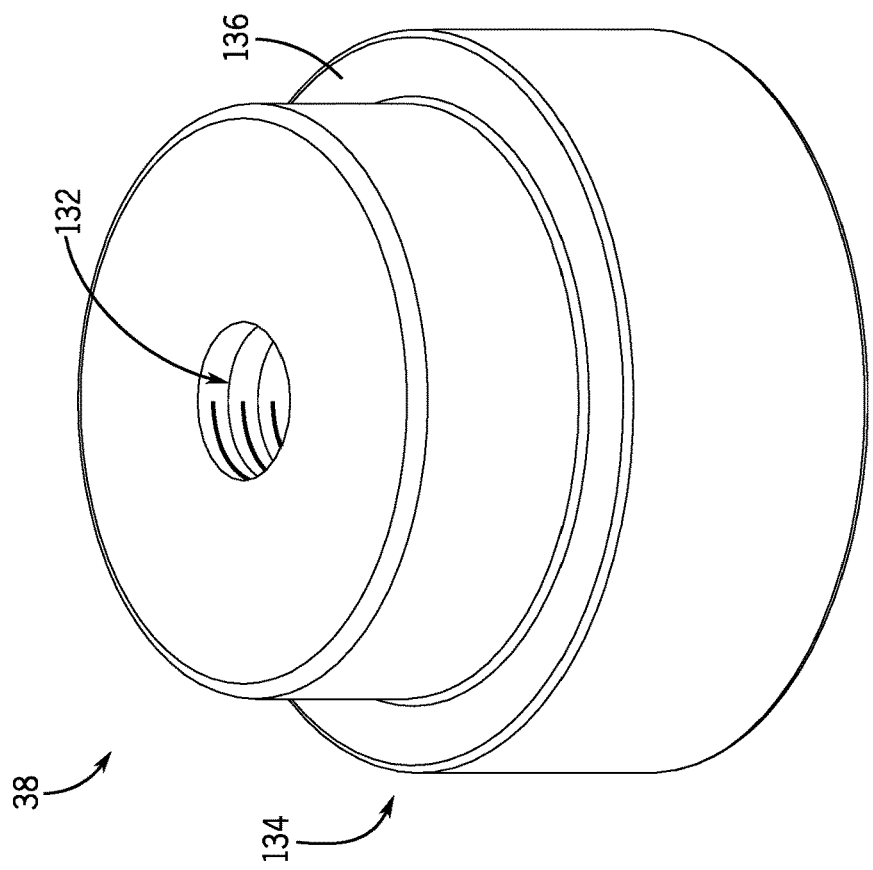
Figure 11C:
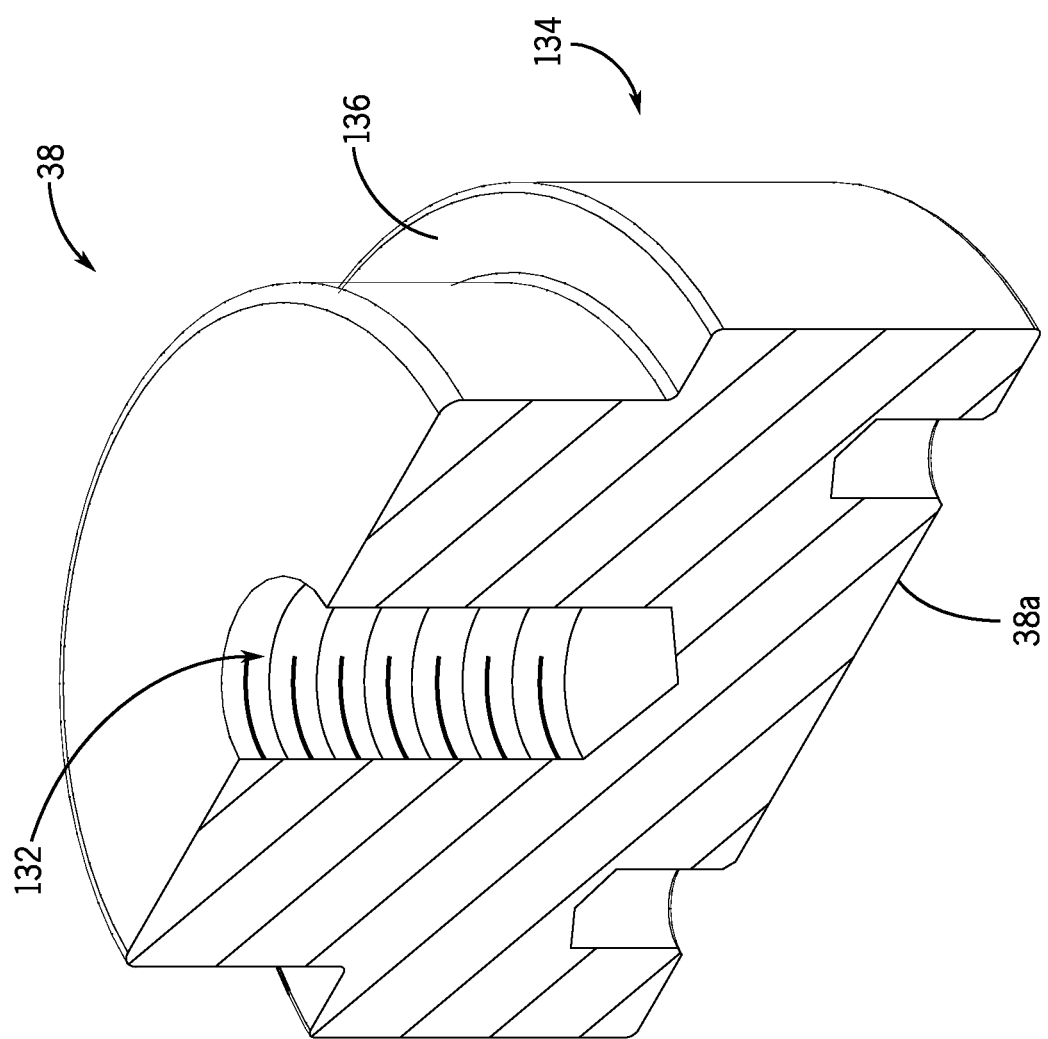
Figure 13:
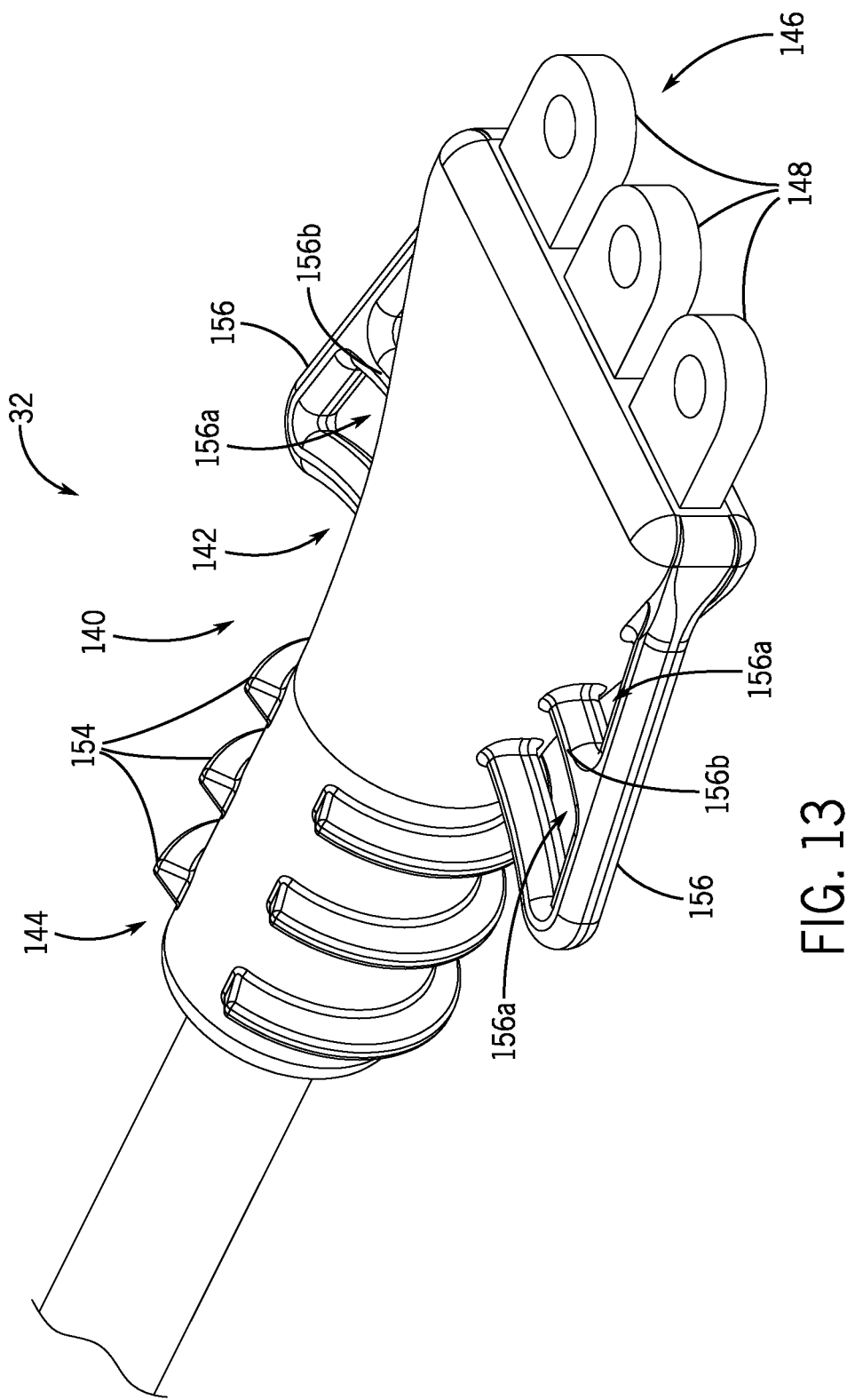
FIG. 13 is a top, left, front perspective view of the tip receptor mount of FIGS. 12A through 12C.
Figure 14:
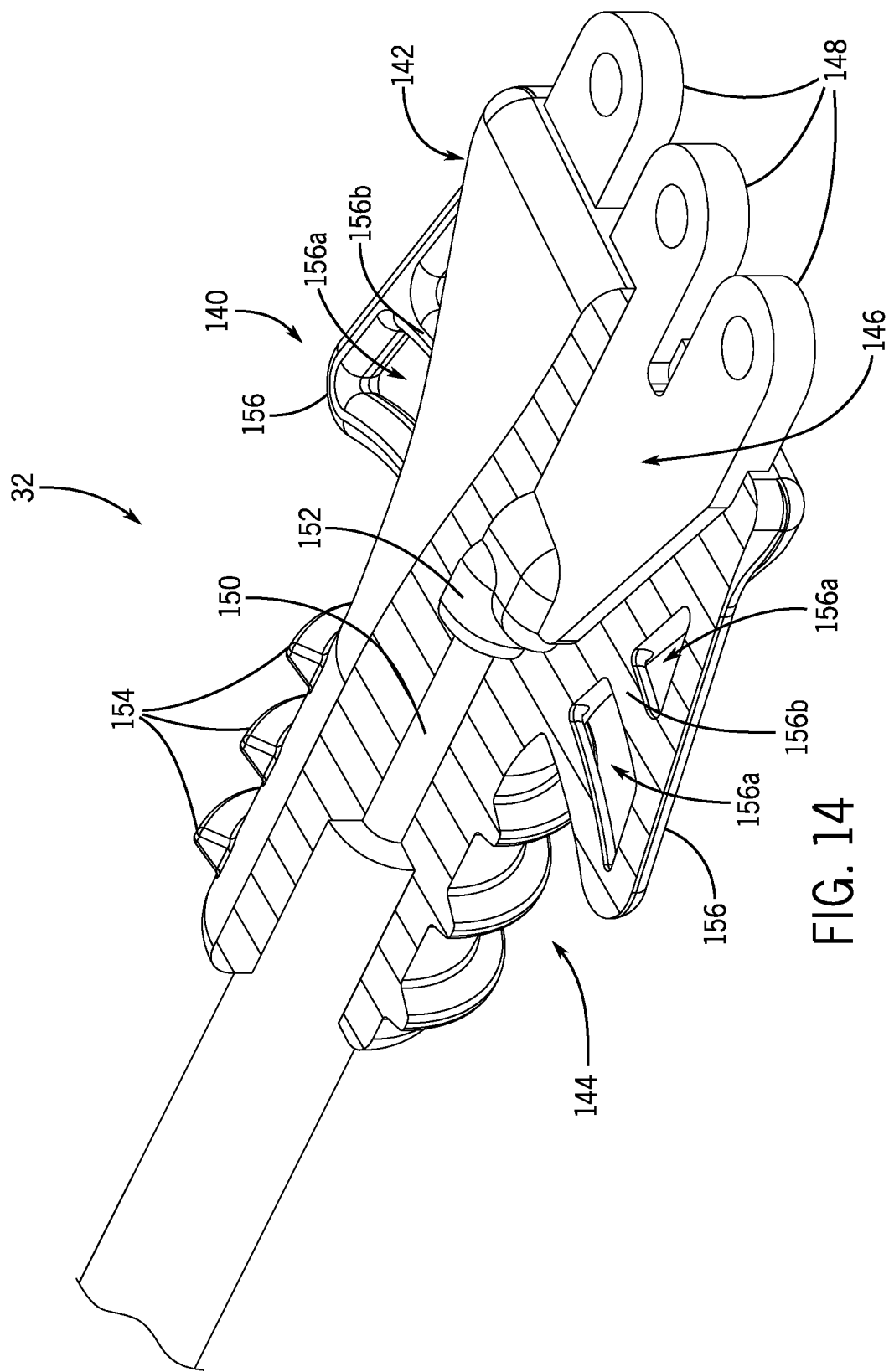
FIG. 14 is a top, left, front, partial sectional perspective view of the tip receptor mount of FIGS. 12A through 12C.

FIGS. 11A and 11C illustrate aspects of the side receptor disk 38, which can be generally configured for attachment to the side receptor plug 36. Generally, the side receptor disk 38 includes the receptor surface 38a at one axial end of the side receptor disk 38, and a tapped bore 132 at an opposite axial end of the side receptor disk 38. A body 134 of the side receptor disk 38 can be generally formed from conductive material (e.g., aluminum) and includes a shoulder 136, so that the body 134 exhibits a generally larger radial extent near the receptor surface 38a than it does near the tapped bore 132.

In other embodiments, other configurations for a side receptor are possible. For example, in the side receptor disk 38, the axial end of the side receptor disk 38 that is opposite the receptor surface 38a can include a threaded post or other attachment mechanism, in place of the tapped bore 132, to connect the side receptor disk 38 to the side receptor plug 36. In some embodiments, a side receptor can be configured with non-cylindrical (or other) geometry.

FIGS. 12A through 14 illustrate aspects of the tip receptor mount 32 of FIG. 1. Generally, the tip receptor mount 32 includes an overmolded body 140 with a flared connection portion 142, and a generally cylindrical neck portion 144. The overmolded body 140 can be formed, for example, from non-conductive (e.g., plastic) material in order to discourage lightning attachment to conductive elements internal to the blade 22 and to generally act as an insulator for electrical current moving through the LP system 20.

The connection portion 142 of the overmolded body 140 surrounds part of a conductive connection plate 146 (see, in particular, FIG. 13), with various (e.g., three) lugs 148 of the connection plate 146 extending outside of the connection portion. The neck portion 144 of the overmolded body 140 surrounds part of a conductor, such as a copper (or other) cable 150. An exothermic weld connection 152 (see FIG. 13), or other type of connection, also surrounded by the body 140, can allow electrical current entering the tip receptor mount 32 via the lugs 148 (e.g., due to a lightning strike on the tip receptor 30 (see FIG. 1)) to be transmitted through and out of the tip receptor mount 32 via the cable 150.

The overmolded body 140 of the tip receptor mount 32 can include various features to assist in handling the tip receptor mount 32 and securing the tip receptor mount 32 in place relative to a blade. For example, in the embodiment illustrated in FIGS. 11A through 13, the neck portion 144 includes a series of partial circumferential ridges 154 that can provide a relatively secure grasping surface for an operator to manipulate the body 140, and can also help to engage the neck portion 144 with bonding material for anchoring the tip receptor mount 32 within a blade. In some embodiments, the ridge 154 can extend fully around the circumference of the neck portion 144, or can exhibit various other configurations, such as a saw-toothed profile extending generally circumferentially around the neck portion 144, or a straight (or other) profile extending generally axially along the neck portion 144.

Generally, the tip receptor mount 32 can also include bonding wings with non-conductive lattices, to help to secure the tip receptor mount 32 within a blade. As illustrated in FIGS. 12A through 14, for example, a pair of non-conductive, latticed bonding wings 156 flare generally outward from the connection portion 142 of the tip receptor mount, from a perspective moving from the lugs 148 towards the cable 150 (i.e., from right to left in FIG. 11B). In the embodiment illustrated, the bonding wings 156 have a generally triangular perimeter, with generally triangular or trapezoidal lattice openings 156a separated by lattice ribs 156b. In other embodiments, other configurations are possible. When epoxy bonding paste, resin, or other similar bonding material is used to secure the tip receptor mount 32 within a blade, the bonding material can fill the lattice openings 156a in the bonding wings 156 before curing, and thereby help to mechanically lock the tip receptor mount 32 to the relevant blade structure. This can be useful, for example, in helping to prevent solid metal tips (e.g., the tip receptor 30) from being thrown from rotating blades in cases where a down conductor fractures near the tip of a blade.

As illustrated in FIGS. 15A and 15B, the tip receptor 30 can include various mounting features corresponding to the lugs 148 (or other attachment mechanisms) of the tip receptor mount 32. In the embodiment illustrated, the tip receptor 30 includes a set of three rectangular apertures 160 with rounded blind ends corresponding to the geometry of the three lugs 148 of the tip receptor mount 32. The tip receptor 30 further includes three blind, tapped apertures 162 extending perpendicularly through the tip receptor 30 to intersect the rectangular apertures 160. In the embodiment illustrated, two of the apertures 162 extend from the one side of the tip receptor 30 and one of the apertures 162 extends from the opposite side of the tip receptor 30. In other embodiments, other configurations are possible, including configurations with different numbers of apertures.

Figure 16A:
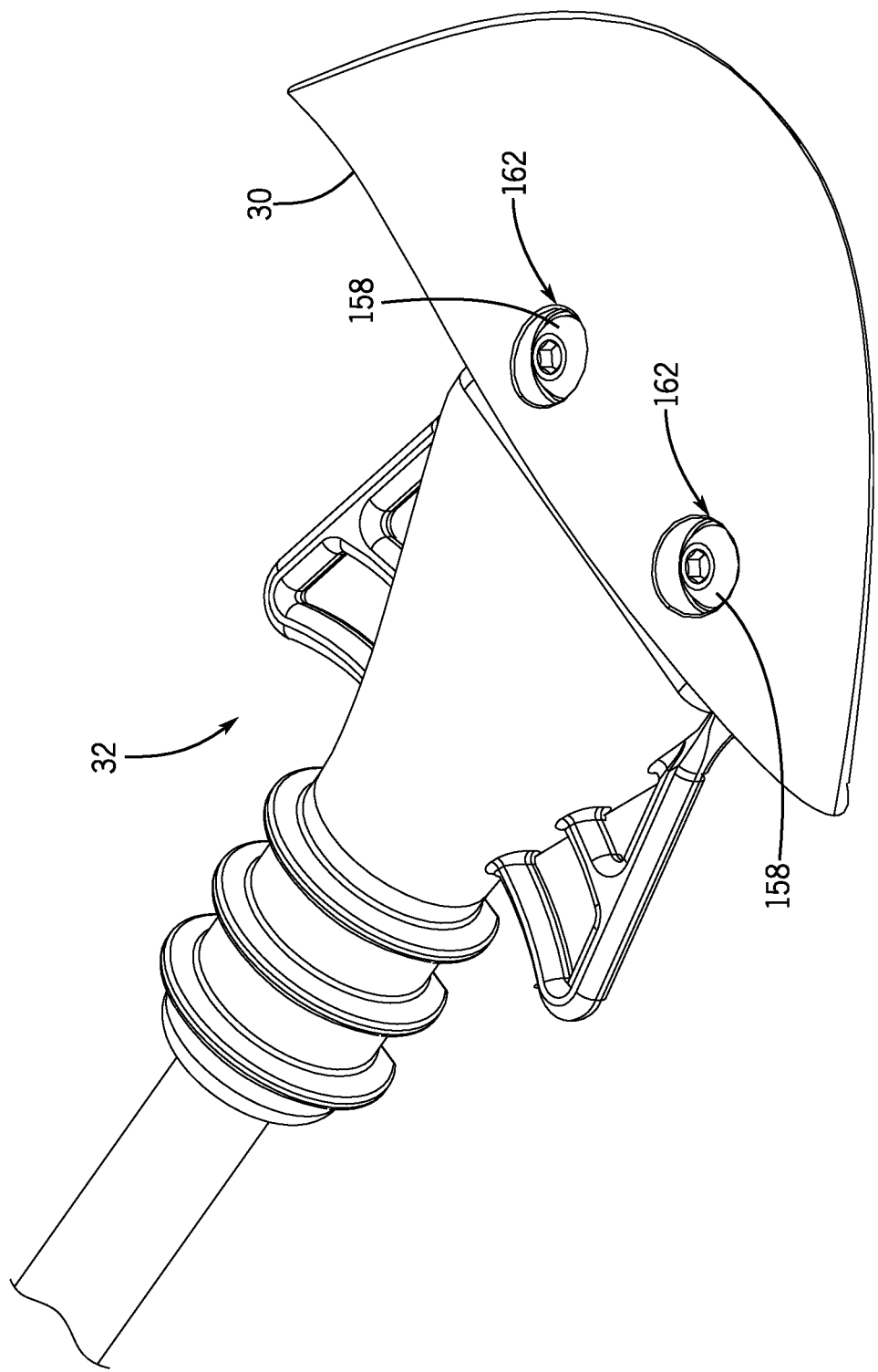
FIG. 16A is a top, left, front perspective view of the tip receptor mount of FIGS. 12A through 14 secured to the tip receptor of FIGS. 15A and 15B.
Figure 16B:
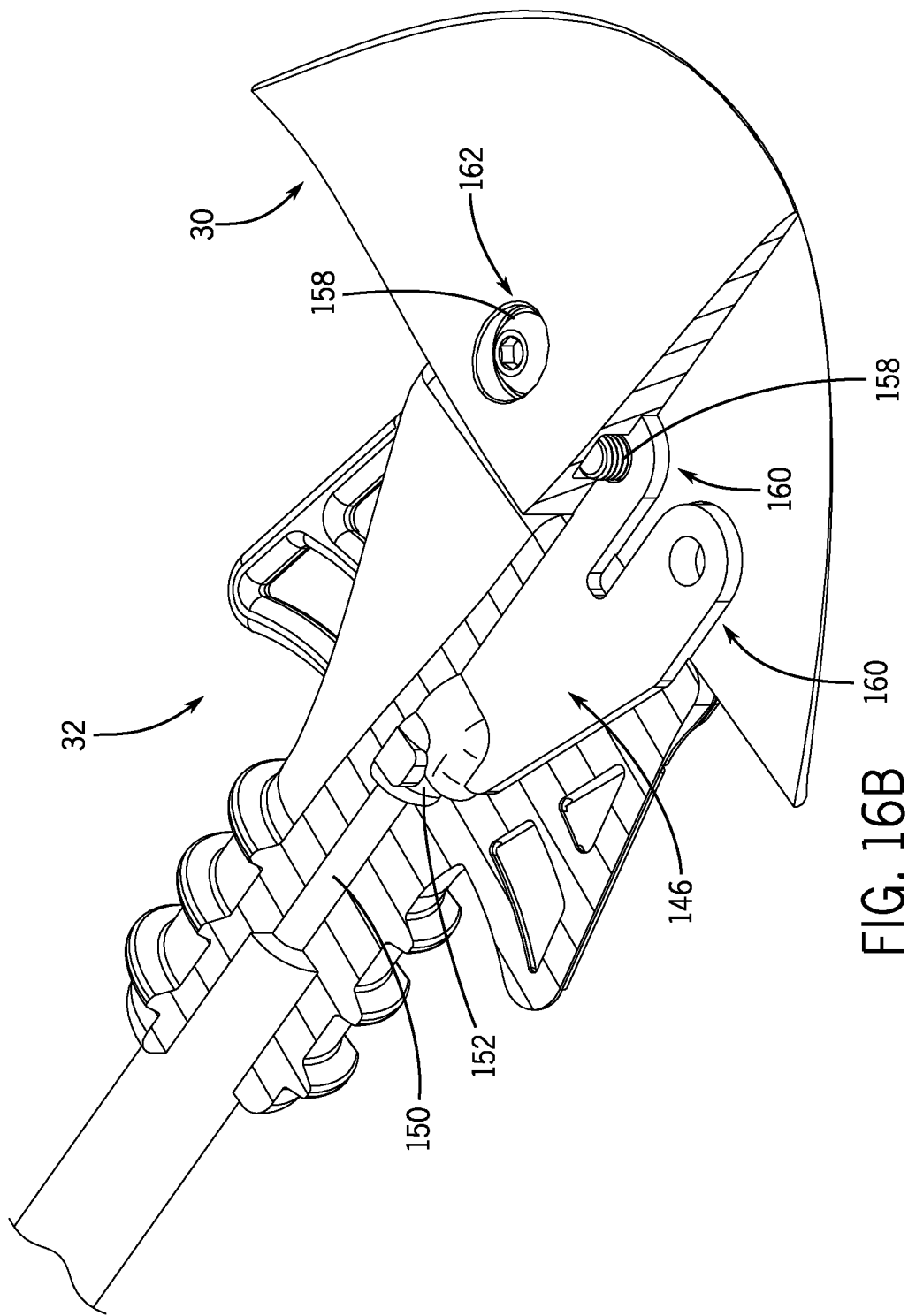
FIG. 16B is a top, left, front, partial sectional perspective view of the tip receptor mount and tip receptor of FIG. 16A.

During installation as part of the LP system 20, the tip receptor mount 32 can be secured to the tip receptor 30 using the lugs 148. For example, as illustrated in FIGS. 16A and 16B, the three lugs 148 on the illustrated tip receptor mount 32 can be inserted into the rectangular apertures 160 and secured therein using bolts 158 that extend through the tapped apertures 162 to engage the lugs 148. Accordingly, electrical current entering the tip receptor 30 (e.g., due to a lightning strike) can travel into the tip receptor mount 32 via the lugs 148, before passing into the cable 150 and onward to ground.

In the embodiment illustrated in FIGS. 16A and 16B, three of the bolts 158 are used to secure the tip receptor 30 to the three lugs 148, with a central one of the bolts 158 extending into a central one of the lugs 148 (and the tip receptor 30) in an opposite direction than the two side bolts 158 (only one of the bolts 158 is illustrated in FIG. 16B). In other embodiments, other configurations are possible. In some embodiments, for example, different numbers, shapes, or arrangements of lugs and corresponding apertures can be used. In some embodiment, the lugs can include tapped holes, to receive bolts extending through corresponding apertures in the tip receptor.

Usefully, due to the configurable nature embodied in the tip receptor mount 32 and the tip receptor 30, a particular tip receptor (and corresponding tip receptor mount) according to the invention can be customized to accommodate a particular blade or blade tip design, as needed. As illustrated in FIG. 17, for example, a tip receptor mount 32a can be configured with a generally similarly exterior profile as the tip receptor mount 32 illustrated in FIGS. 12A through 14. In contrast to the tip receptor mount 32, however, the tip receptor mount 32a includes only two lugs 148a, as may correspond to a tip receptor (not shown) with only two mounting locations (e.g., a smaller, thinner, or otherwise differently shaped tip receptor as compared to the tip receptor 30 of FIGS. 15A and 15B). Similarly, in other embodiments (not shown), the size or orientation of the bolt holes in lugs of a tip receptor mount can be varied, as can aspects of various other features.

As noted above, embodiments of the disclosed LP system (e.g., the LP system 20 of FIG. 1) can be installed relatively efficiently in a blade, as compared to conventional systems and conventional installation processes. Generally, in this regard, various sockets can be molded into two separate blade walls, then removable tabs removed from the bottom walls of the sockets in order to provide generally uniform holes through the blade walls (via the sockets). A first set of receptor plugs can then be secured to the sockets on a first of the blade walls, and a second set of receptor plugs can be temporarily secured to the first blade wall. The blade walls can be joined together, so that the receptor plugs (including those secured to sockets and those temporarily secured to the blade wall) are disposed within the interior of the blade. A tool can then be extended through the hole in each of the sockets on the second blade wall to engage a corresponding one of the temporarily secured receptor plugs and move that receptor plug into engagement with the relevant socket. Finally, receptor elements (e.g., receptor disks) can be secured to the various receptor plugs via the openings in the sockets.

As one example, FIGS. 18A through 18K illustrate a process for installing two of the sockets 34 into a blade 170 (see FIGS. 18J and 18K), along with a corresponding two of the side receptor plugs 36 and the side receptor disks 38.

Figure 18B:
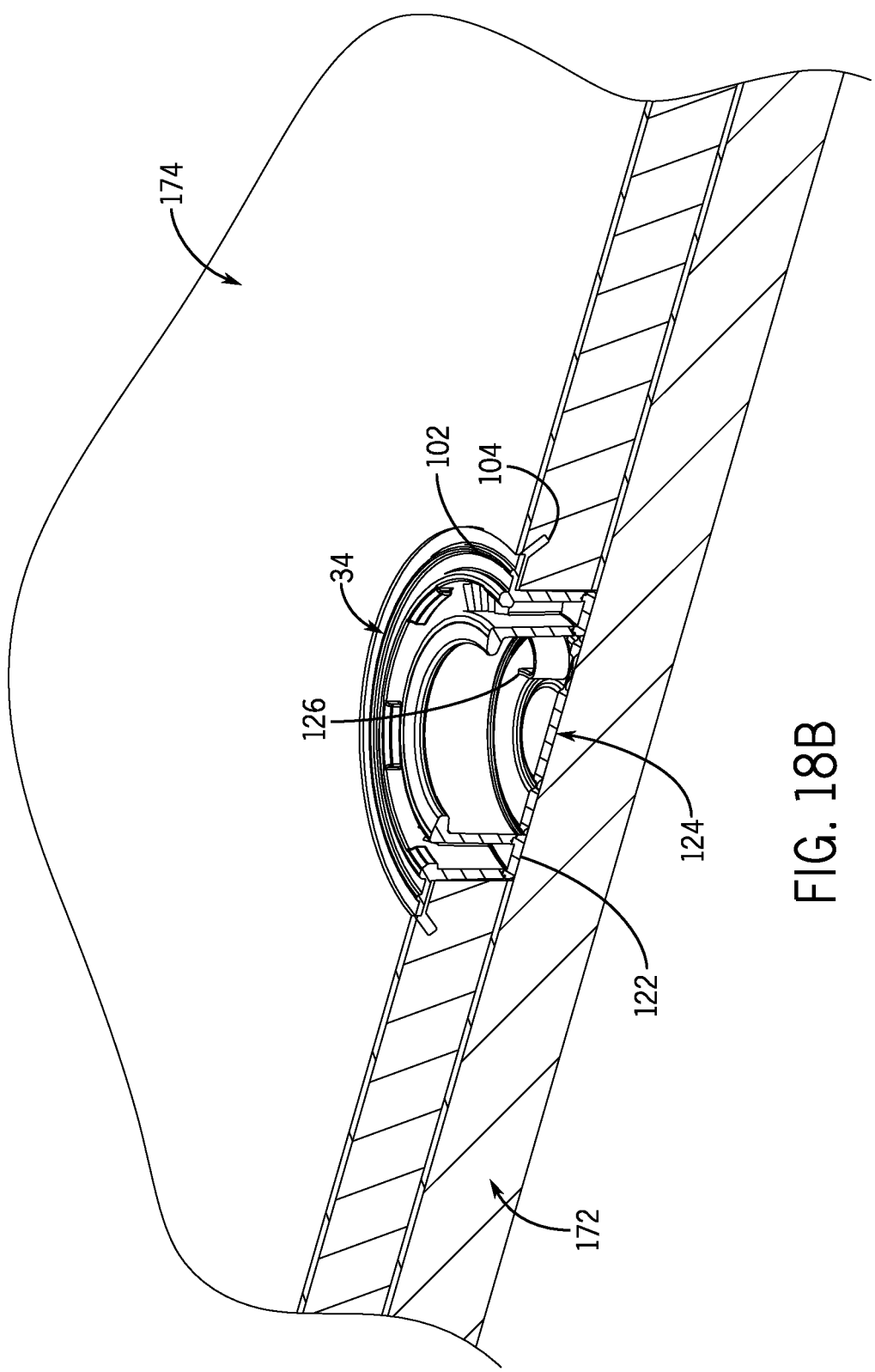

As illustrated in FIG. 18A, one of the sockets 34 can first be placed on a blade mold 172, with the bottom plate 122 (and the tear-away tab 124) seated against the blade mold 172. As illustrated in FIG. 18B, a lower blade wall 174 can then be built and resin pulled therethrough, according to appropriate methods of blade manufacturing. When the resin has cured and the blade mold 172 has been removed, the socket 34 will accordingly be molded into the blade wall 174, with the bottom plate 122 (and the tear-away tab 124) at an exterior surface of the blade wall 174, and with the cylindrical and annular recesses 112 and 114 of the socket 34 opening at an interior surface of the blade wall 174.

As the resin is pulled and cured, the configuration of the socket 34 can provide various benefits. As one example, the perimeter flange 102 of the socket can provide a defined mounting surface for materials (e.g., tacky tape) that can be used to prevent resin from flowing into unwanted locations. Likewise, the bottom plate 122, with the tear-away tab 124 intact, can prevents resin from entering into the interior of the socket 34 from the bottom of the socket 34 during the resin dispersal process.

As another benefit, the configuration of the perimeter flange 102 can help to anchor the socket 34 in place relative to the blade wall 174. For example, as resin is pulled, the resin can flow over the angled lip 104 on the perimeter flange 102 (see, e.g., FIG. 18B), which can help to lock the socket 34 into the blade wall 174 and thereby help to prevent the socket 34 from moving towards the interior blade cavity (i.e., upward from the perspective of FIG. 18B) once the resin has cured. Likewise, because the radial extent of the perimeter flange 102 is generally larger than that of the cylindrical body 100 of the socket 34, the flange can generally help to prevent the socket 34 from moving towards the exterior of the blade (i.e., downwards from the perspective of FIG. 18B).

In some embodiments, the angled lip 104 can be configured differently, while still helping to anchor the socket 34 in place relative to the blade wall 174. For example, in some embodiments, the angled lip 104 can be configured as a stepped (e.g., right-angle) feature. Similarly, in some embodiments, the angled lip 104 can include holes (e.g., circular holes) to receive resin as the blade wall 174 is formed.

As still another benefit, once encapsulated by resin during the dispersal process, the gussets 108 around the exterior of the cylindrical body 100 can provide an anti-rotational lock relative to the blade wall 174. Further, because the bottom plate 122 can be seated directly on the blade mold 172, the socket 34 can be automatically aligned to support one of the receptor disks 38 (see, e.g., FIG. 18J) with the receptor disk 38 at an appropriate depth and angular alignment relative to the exterior surface of the blade wall 174.

In some embodiments, the sockets 34 can be configured in other ways to resist rotation once the socket 34 is molded into the blade wall 174. For example, one or more of the sockets 34 can include saw-tooth or other external patterns or contours on the relevant cylindrical body 100 (or elsewhere) to provide an anti-rotational lock relative to the blade wall 174.

In the embodiment illustrated in FIGS. 18A-18H, the resin layer of blade wall 174 is formed directly on the blade mold 172 as the resin is pulled. In other embodiments, various layers of material can be interposed between the blade mold 172 and the resin layer of the blade wall 174. In some embodiments, accordingly, the socket 34 can be seated directly on the blade mold 172 (e.g., in a cut-out in one or more relevant layers). In some embodiment, the socket 34 can be seated indirectly on the mold, and can be seated directly on one or more layers above the mold 172. It will be understood that, in either of these configurations, the socket 34 can be viewed as having been placed (or seated) "on" the blade mold 172 for the formation process.

Figure 18C:
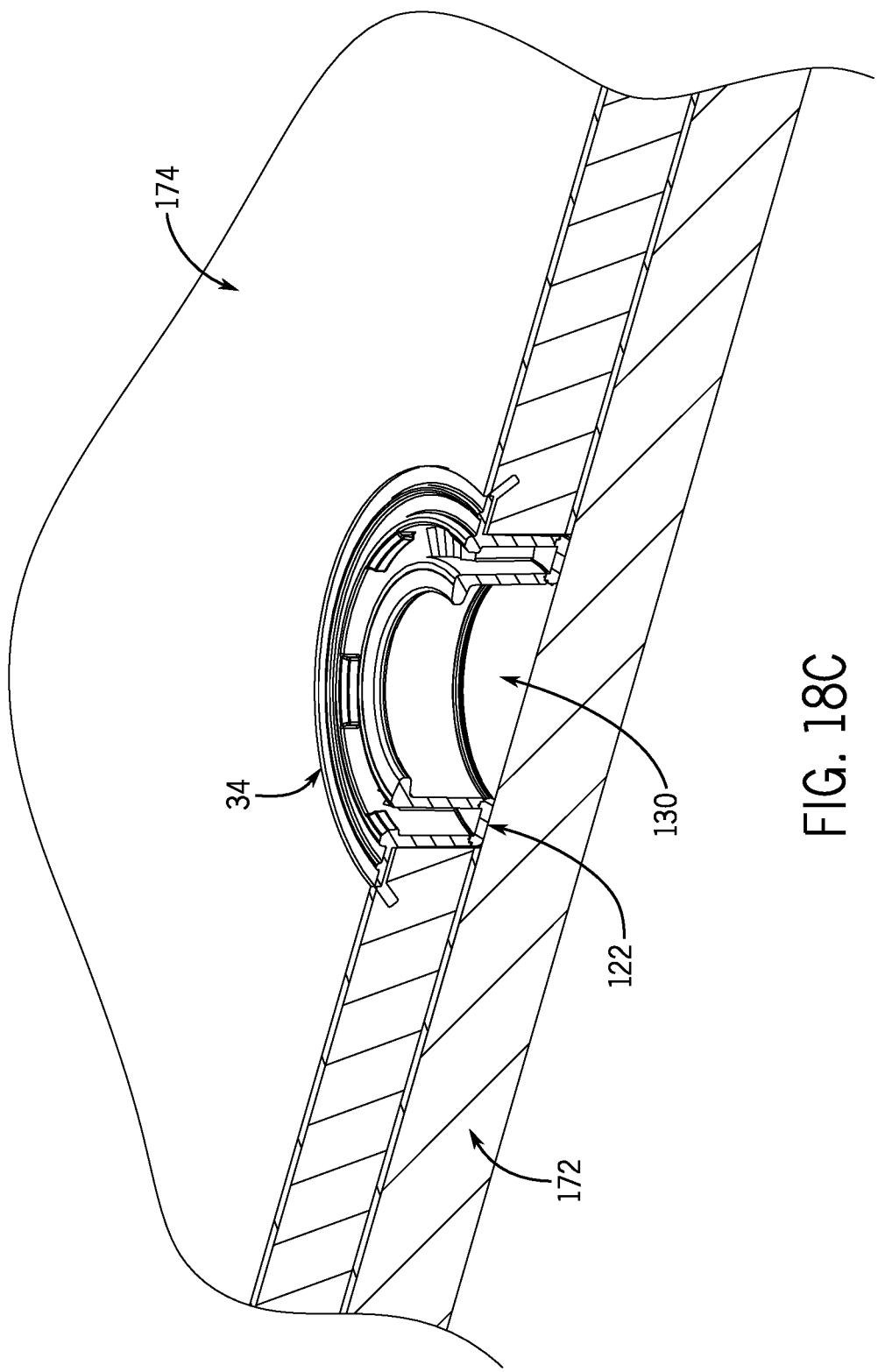

As illustrated in FIGS. 18B and 18C, after the blade wall 174 has cured, the tear-away tab 124 of the socket 34 can be removed (e.g., using the gripping feature 126 (see FIG. 18B)), so that the circular hole 130 in the socket 34 provides a consistent, engineered opening in the blade wall 174. In this regard, despite the removal of the tear-away tab 124, the welded seams of the bottom plate 122 can help to keep water and debris from entering the interior of the blade 170 through the socket 34.

Figure 18D:
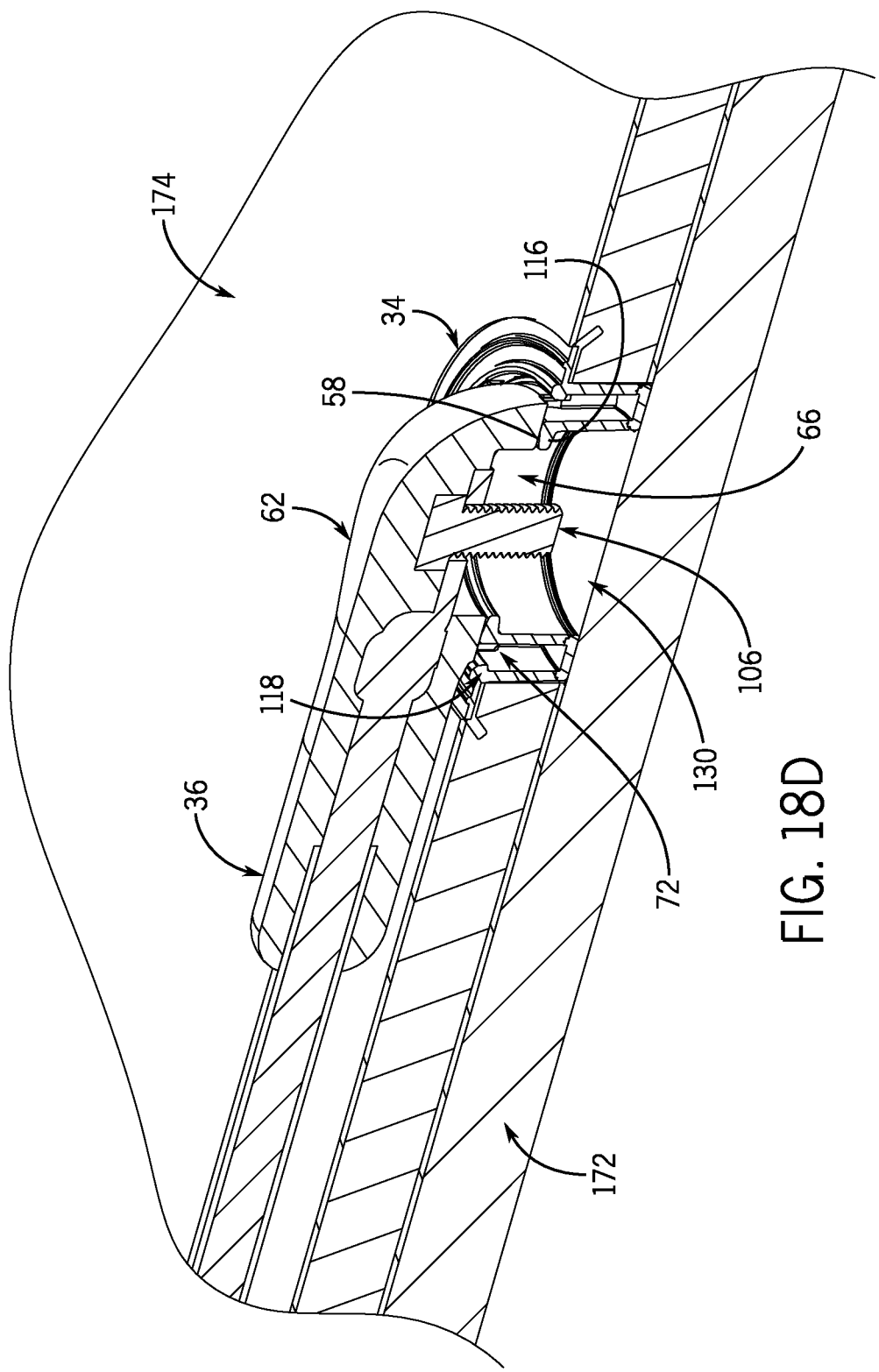

As illustrated in FIG. 18D, once the socket 34 is appropriately seated in the blade wall 174, one of the side receptor plugs 36 can be secured to the socket 34. In the embodiment illustrated, for example, the side receptor plug 36 can be positioned with the shell portion 62 and the open end 66 generally aligned with the central opening 106 and the circular hole 130 of the socket 34. Generally axial force can then be applied to snap the retention shoulders 72 (see, e.g., FIG. 4A) past the retention shoulders 118 (see, e.g., FIG. 6C) and thereby to secure the side receptor plug 36 to the socket 34 with a snap fit connection. In this configuration, the teeth 74 on the side receptor plug 36 (see, e.g., FIG. 4A) can also engage the teeth 120 on the socket 34 (see, e.g., FIG. 6C) in order to provide anti-rotation force to the side receptor plug 36 (relative to the socket 34). With the side receptor plug 36 thus installed, the shoulder 58 of the side receptor plug 36 can seat against (e.g., directly, or via a gasket or other element) the cylindrical flange 116 of the socket 34 to appropriately locate the retention shoulders 72 and the teeth 74 relative to the retention shoulders 118 and the teeth 120.

Due to the circumferential arrangement of the respective sets of the retention shoulders 72 and 118 and the teeth 74 and 120, the socket 34 and side receptor plug 36 can generally be secured to one another regardless of the particular relative rotational orientations of the socket 34 and the side receptor plug 36. This can be useful, for example, in order to allow the cable 84 (see, e.g., FIG. 18D) to extend away from the socket 34 at any number of angles, as appropriate for the particular design of the relevant LP system.

With the side receptor plug 36 secured to the socket 34, as illustrated in FIG. 18D, the side receptor plug 36 can generally close the socket 34 to infiltration of water and debris into the interior of the blade 170. In some embodiments, one or more sealing elements such as gaskets, over-molding, silicon, adhesive, and so on (not shown) can be disposed between the side receptor plug 36 and the socket 34 (e.g., at the cylindrical flange 116 (see, e.g., FIG. 6C)), or at other locations, in order to further seal the assembly.

Figure 18E:
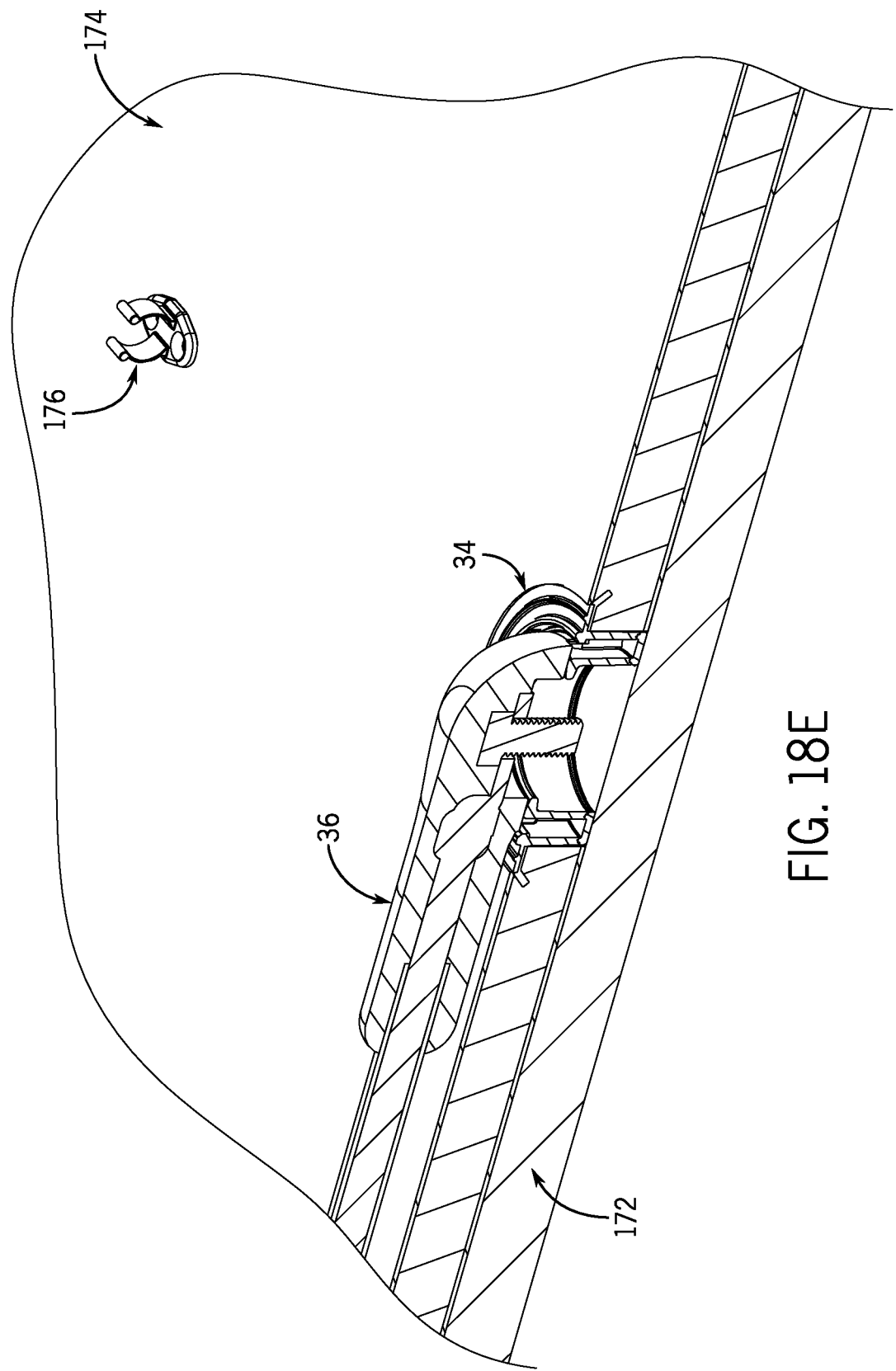
Figure 18F:
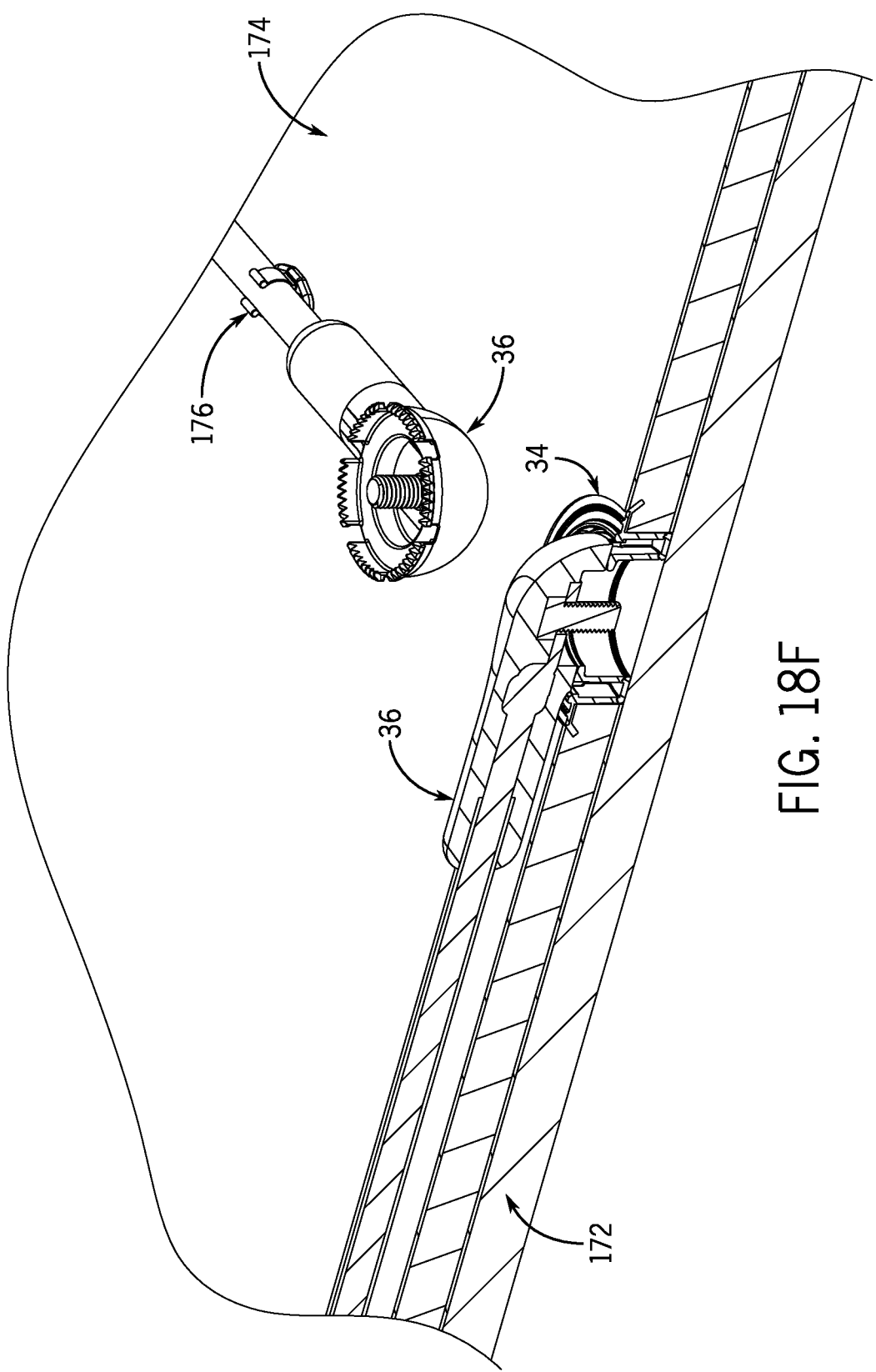

As illustrated in FIGS. 18E and 18F, before the blade 170 is fully closed, additional side receptor plugs can be secured to the interior surface of the blade wall 174. For example, a clip 176 (see FIG. 18E) can be secured to the interior surface of the blade wall 174, and then a cable for another one of the side receptor plugs 36 can be secured to the clip 176 (see FIG. 18F) with the open end 66 of the side receptor plug 36 facing away from the blade wall 174. In other embodiments, a side receptor plug (or other component) can be secured to the blade wall 174 in other ways (e.g., with adhesives).

Figure 18G:
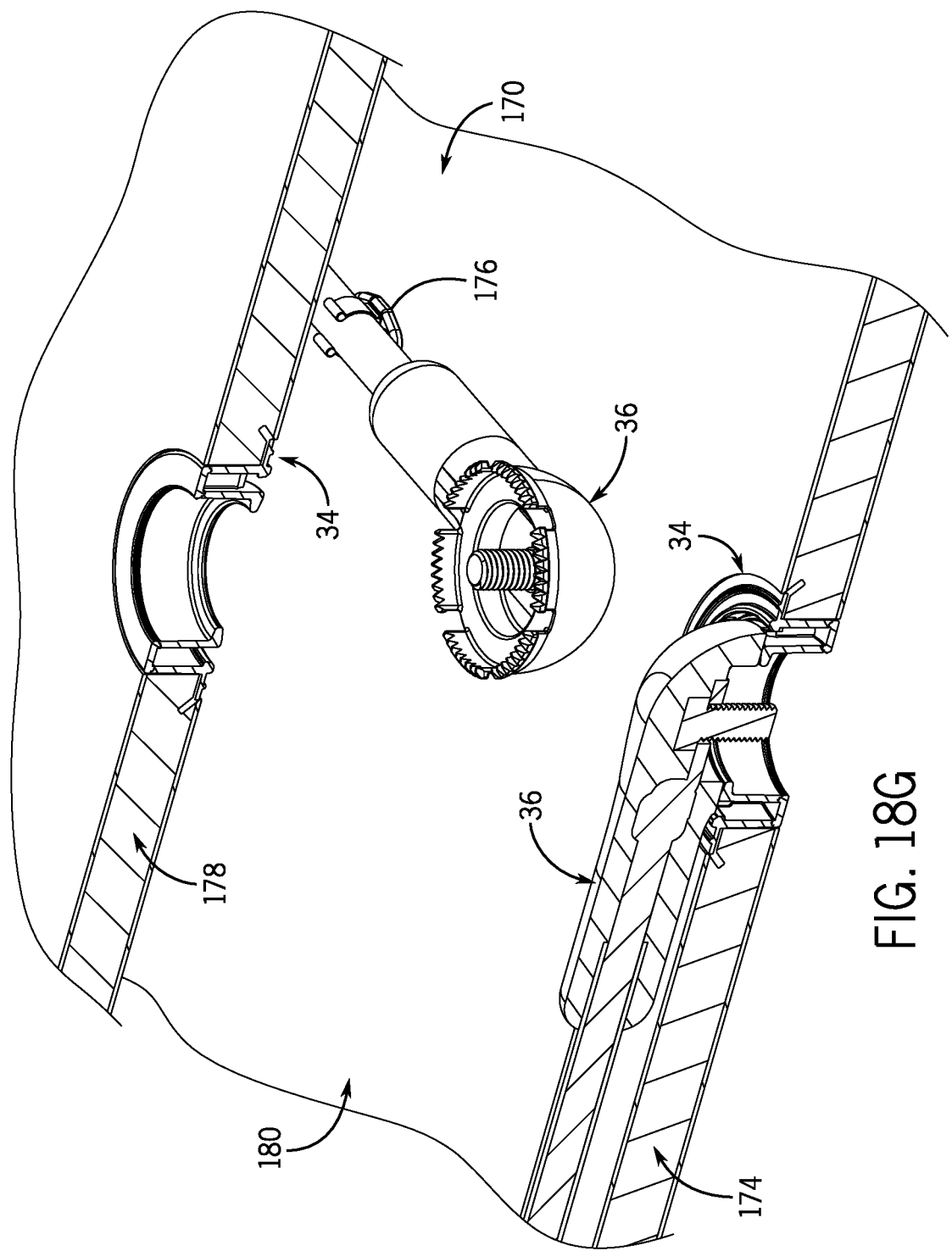

With an appropriate number of the side receptor plugs 36 secured in corresponding sockets 34 in the blade wall 174, and with an appropriate number of the side receptor plugs 36 clipped (or otherwise adhered) to the interior surface of the blade wall 174, an upper blade wall 178 can be installed, thereby fully defining the blade 170 and the corresponding interior blade cavity 180 (see FIG. 18G). As illustrated in FIG. 18G, one (or more) of the sockets 34 can be molded into the blade wall 178 before the blade wall 178 is installed, with the location of the socket(s) 34 in the blade wall 178 generally corresponding to the location of the side receptor plug(s) 36 that have been clipped (or otherwise adhered) to the interior surface of the blade wall 174.

Once the blade walls 174 and 178 have been joined, a tool can be inserted into the sockets 34 in the blade wall 178, engaged with the corresponding side receptor plugs 36 that were clipped (or otherwise temporarily attached) to the blade wall 174, then used to lift the side receptor plug 36 into engagement with the socket 34. As illustrated in FIGS. 18H and 18I, for example, a rod 182 with a threaded engagement nut 184 can be inserted into the socket 34, threaded onto the bolt 76 of the side receptor plug 36 (see FIG. 18G), used to pull the receptor plug 36 into engagement with the relevant socket 34, and then unscrewed from the bolt 76. In this way, for example, the side receptor plugs 36 (and side receptors generally) can be installed on the upper and lower walls 178 and 174 of the blade 170 without the need to cut and repair holes in the blade 170.

Figure 18J:
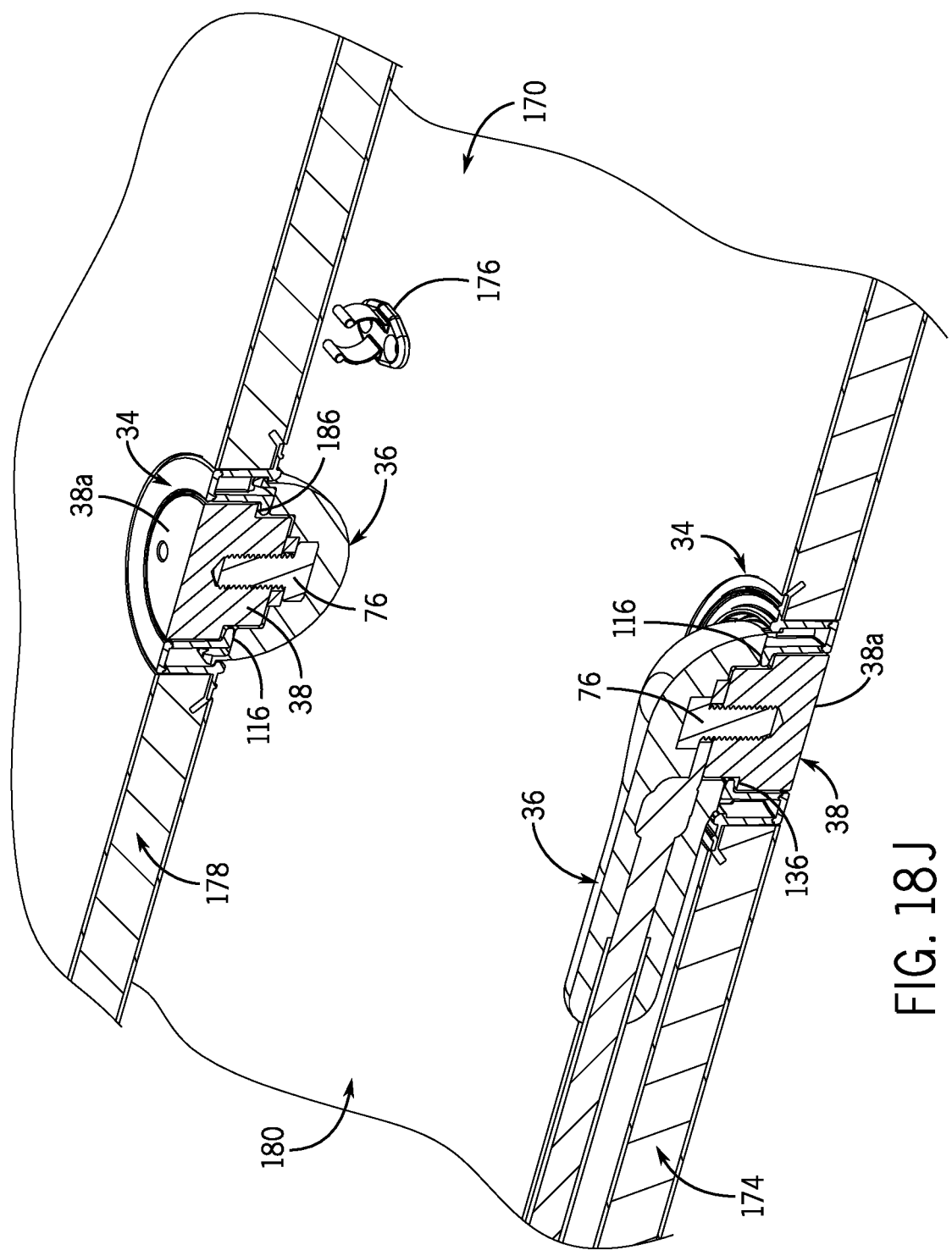
Figure 18K:
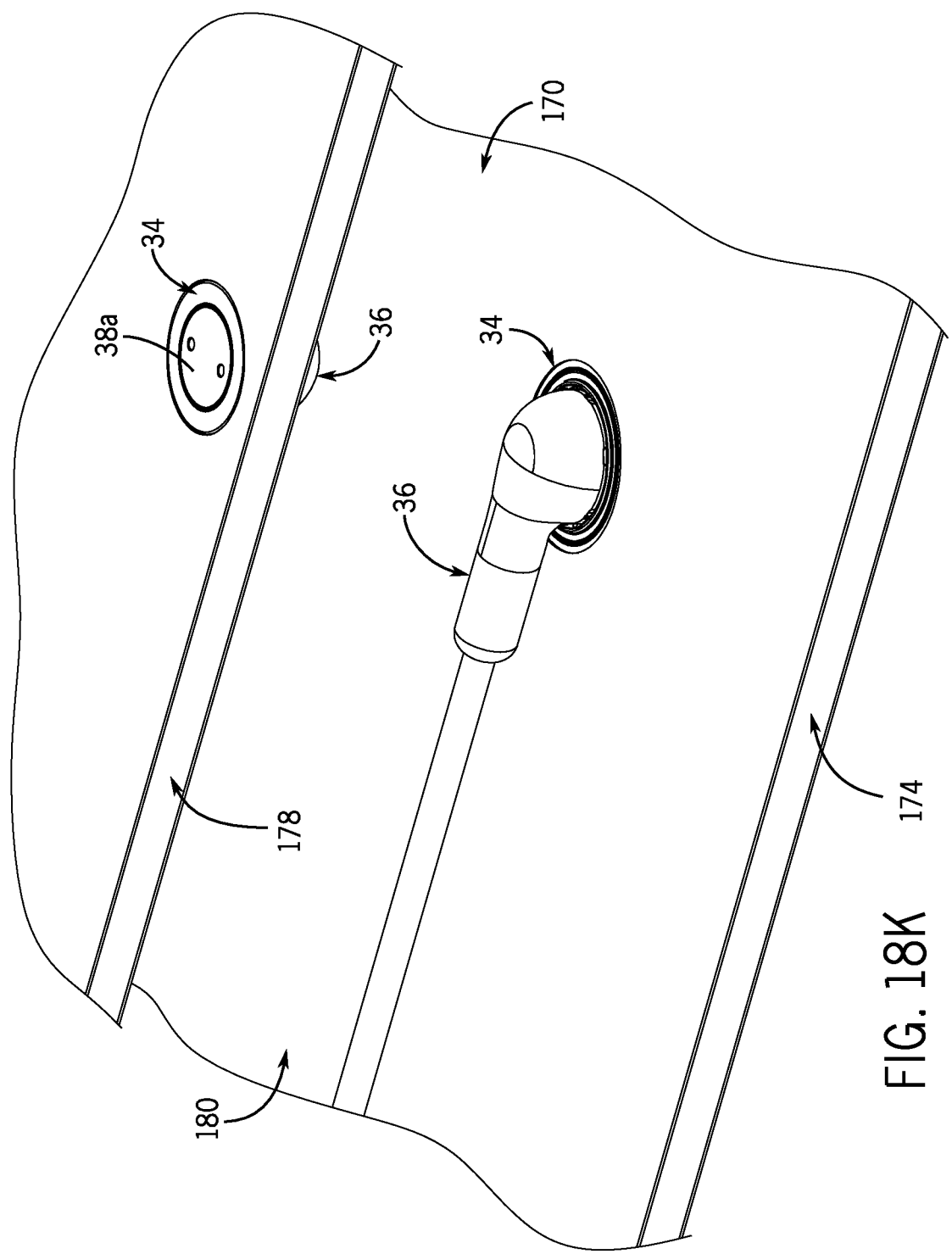

As illustrated in FIG. 18J, once the side receptor plugs 36 have been secured to the respective sockets 34, respective side receptor disks 38 (or other receptor elements) can be secured to the side receptor plugs 36. As also noted above, the installation of the sockets 34 directly into the blade walls 174 and 178 during the manufacture of the blade 170, and the relative geometry of the sockets 34 and the side receptor plugs 36, can help to support the side receptor disks 38 with the respective receptor surfaces 38a in appropriately flush alignment with the exterior surfaces of the blade walls 174 and 178.

During installation and thereafter, the flanges 116 in the side receptor plugs 36 can interact with the shoulders 136 on the receptor disks 38 to help to prevent the receptor disks 38 from passing into the interior of the blade 170 (e.g., if one of the side receptor plugs 36 is inadvertently removed from its respective socket 34). Further, in the event that one of the side receptor plugs 36 was not properly seated on the respective socket 34 when initially installed, the relevant flange 116 can bear on the relevant shoulder 136 as the side receptor disk 38 is tightened onto the relevant bolt 76, to pull the side receptor plug 36 into an appropriate engagement with the socket 34.

As noted above, the inter-engagement of the teeth 74 and 120 on the side receptor plugs 36 and the sockets 34 can provide anti-rotational force, as well as allowing for different relative angular alignment of respective pairs of the side receptor plugs 36 and the sockets 34. In some embodiments, the teeth 74 and 120 can be configured to provide sufficient anti-rotational force so as to allow a predetermined level of torque to be applied to secure the receptor disks 38 to the respective side receptor plugs 36.

It will be understood that the particular sequence of steps discussed above with regard to FIGS. 18A through 18J are presented as an example only. In other embodiments, other methods of installation are possible. For example, in some implementations, the side receptor disk 38 can be installed before the blade 170 is closed, or at other times during the installation process. Similarly, in some implementations, the tear-away tab 124 can be removed at a different time than is expressly illustrated and discussed above.

It will further be understood that the general method of installation discussed above can be applied to an LP system with a different arrangement than that illustrated in FIGS. 18A through 18J. For example, the discussed method can be used with LP systems that include different numbers, configurations, and arrangements of side receptor plugs, sockets, and side receptor disks, or other components than those expressly illustrated and discussed above.

Thus, embodiments of the disclosed LP system and method of installation can provide various benefits compared to conventional LP systems and methods of installation. For example, in some embodiments, the disclosed LP system can allow for highly customizable configuration of tip and side receptors for wind turbine blades, and can allow side receptor disks to be accurately installed on both sides of a blade without requiring the blades to be cut and then repaired.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A method of installing a lightning protection system in a blade wall formed on a mold, the lightning protection system including a receptor plug, a receptor element, and a socket with a bottom wall, the method comprising:
    placing the bottom wall of the socket on the mold;
    forming the blade wall on the mold so that the blade wall is formed around, and at least partly includes, the socket;
    removing at least part of the bottom wall of the socket to provide an opening through the blade wall via the socket;
    securing the receptor plug to the socket, with the receptor plug on an interior side of the blade wall; and
    after removing the at least part of the bottom wall, securing the receptor element to the receptor plug via the opening.

2. The method of claim 1, wherein removing the at least part of the bottom wall of the socket includes manually removing a tear-away tab from the socket to provide the opening through the blade wall via the socket.

3. The method of claim 1, wherein securing the receptor plug to the socket includes engaging a plurality of first teeth on the receptor plug with a plurality of second teeth on the socket to resist rotation of the receptor plug relative to the socket.

4. The method of claim 3, wherein securing the receptor plug to the socket further includes engaging a first retention shoulder of the receptor plug with a second retention shoulder of the socket.

5. The method of claim 4, wherein the receptor plug includes a retention tab that includes the first retention shoulder and the plurality of first teeth; and
    wherein engaging the first retention shoulder with the second retention shoulder includes inserting the retention tab into a central opening of the socket to cause the first retention shoulder to engage the second retention shoulder and to cause the plurality of first teeth to engage the plurality of second teeth.

6. The method of claim 1, wherein the blade wall is a first blade wall, the method further comprising:
    before securing the receptor plug to the socket:
        forming a second blade wall;
        temporarily securing the receptor plug to an interior side of the second blade wall; and
        joining the first blade wall to the second blade wall to define a blade cavity, with the receptor plug disposed within the blade cavity;
    wherein securing the receptor plug to the socket includes:
        after removing the at least part of the bottom wall of the socket, accessing the receptor plug via the opening to remove the receptor plug from the second blade wall and secure the receptor plug to the socket.

7. The method of claim 6, wherein securing the receptor plug to the socket further includes:
    pulling the receptor plug, with a tool inserted through the opening, to form a snap fit connection between the receptor plug and the socket, with a plurality of first teeth on the receptor plug engaging a plurality of second teeth on the socket to resist rotation of the receptor plug relative to the socket.

8. A method of installing a lightning protection system in a wind turbine blade with a first blade wall formed on a first blade mold, a second blade wall formed on a second blade mold, and a blade cavity formed when the first blade wall is secured to the second blade wall, the lightning protection system including a first socket with a first bottom wall, a second socket with a second bottom wall, a first receptor plug, a second receptor plug, a first receptor element, and a second receptor element, the method comprising:

placing the first bottom wall of the first socket on the first blade mold;

forming the first blade wall on the first blade mold so that the first blade wall is formed around, and at least partly includes, the first socket;

after forming the first blade wall, providing a first opening through the first blade wall via the first bottom wall of the first socket;

securing the first receptor plug to the first socket with the first receptor plug at least partly disposed on an interior side of the first blade wall;

placing the second bottom wall of the second socket on the second blade mold;

forming the second blade wall on the second blade mold so that the second blade wall is formed around, and at least partly includes, the second socket;

joining the first blade wall to the second blade wall to form the blade cavity, with the second receptor plug disposed within the blade cavity;

after forming the second blade wall, providing a second opening through the second blade wall via the second bottom wall of the second socket; and accessing the second receptor plug via the second opening to secure the second receptor plug to the second socket.

9. The method of claim 8, wherein providing one or more of the first or second openings includes one or more of:

removing a part of the first bottom wall of the first socket after the first blade wall is formed; or removing a part of the second bottom wall of the second socket after the second blade wall is formed.

10. The method of claim 8, with the first socket including an internal flange and the first receptor element includes a first shoulder, the method further comprising:

as part of securing the first receptor element to the first receptor plug, seating the first shoulder of the first receptor element against the internal flange of the first socket to urge the first receptor plug towards the first socket.

11. The method of claim 8, with the first socket including an exterior flange with an angled lip, the method further comprising:

as part of forming the first blade wall on the first blade mold, forming the first blade wall with the angled lip at least partly disposed within the first blade wall.

12. The method of claim 8, wherein, when the first receptor element is secured to the first receptor plug, an exterior surface of the first receptor element is disposed substantially in parallel with an exterior surface of the first blade wall.

13. The method of claim 8, further comprising, before joining the first blade wall to the second blade wall to form the blade cavity, temporarily securing the second receptor plug to the interior side of the first blade wall; and wherein accessing the second receptor plug via the second opening to secure the second receptor plug to the second socket includes engaging the second receptor plug, via the second opening, to remove the second receptor plug from the first blade wall.

14. The method of claim 8, further comprising:

after securing the first and second receptor plugs to the first and second sockets, respectively, securing the first receptor element to the first receptor plug via the first opening and securing the second receptor element to the second receptor plug via the second opening.

15. A method of installing a lightning protection system in a wind turbine blade, the method comprising:

forming a first blade wall around a first socket, so that an integrally formed first socket wall of the first socket separates a first internal opening of the first socket from an exterior side of the first blade wall;

after forming the first blade wall, removing at least part of the integrally formed first socket wall to provide a first opening through the first blade wall into the first internal opening of the first socket;

securing a first receptor plug to the first socket with the first receptor plug at least partly disposed to an interior side of the first blade wall; and securing a first receptor element to the lightning protection system to provide a conductive path from the exterior side of the first blade wall to the first receptor plug via the first internal opening of the first socket.

16. The method of claim 15, wherein securing the first receptor plug to the first socket includes engaging a plurality of first plug teeth on the first receptor plug with a plurality of first socket teeth on the first socket to resist rotation of the first receptor plug relative to the first socket.

17. The method of claim 16, wherein securing the first receptor element to the lightning protection system includes securing the first receptor element in threaded engagement with the first receptor plug.

18. The method of claim 15, further comprising:

forming a second blade wall around a second socket, so that a second socket wall of the second socket separates a second internal opening of the second socket from an exterior side of the second blade wall;

removing at least part of the second socket wall to provide a second opening through the second blade wall into the second internal opening of the second socket;

securing the first blade wall and the second blade wall to form a blade cavity, with a second receptor plug within the blade cavity;

extending a tool through the second internal opening of the second socket to move the second receptor plug to be secured to the second socket; and securing a second receptor element to the lightning protection system to provide a conductive path from the exterior side of the second blade wall to the second receptor plug via the second internal opening of the second socket.

19. The method of claim 18, wherein securing the second receptor plug to the second socket includes causing a snap-fit engagement of the second receptor plug and the second socket; and wherein securing the second receptor element to the lightning protection system includes securing the second receptor element in threaded engagement with the second receptor plug.

20. The method of claim 15, with the first socket being an integrally formed body, wherein removing the at least part of the first socket wall includes removing part of the integrally formed body.

* * * * *